(12) United States Patent
Treichler et al.

(10) Patent No.: US 9,696,743 B1
(45) Date of Patent: Jul. 4, 2017

(54) GENERATING LEAKAGE CANCELING CURRENT IN ELECTRIC VEHICLE CHARGING SYSTEMS

(71) Applicant: Motiv Power Systems, Inc., Foster City, CA (US)

(72) Inventors: William Treichler, Belmont, CA (US); James Michael Castelaz, Alameda, CA (US); Grayson Zulauf, San Francisco, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 88 days.

(21) Appl. No.: 14/614,118

(22) Filed: Feb. 4, 2015

Related U.S. Application Data

(60) Provisional application No. 62/042,696, filed on Aug. 27, 2014.

(51) Int. Cl.
  *H02J 7/00* (2006.01)
  *G05F 3/02* (2006.01)
  *B60L 11/18* (2006.01)

(52) U.S. Cl.
  CPC .............. *G05F 3/02* (2013.01); *B60L 11/1811* (2013.01)

(58) Field of Classification Search
  CPC ....... Y02E 60/12; H02J 7/0042; H02J 7/0045; H01M 10/46; H01M 10/44
  USPC .......................................................... 320/107
  See application file for complete search history.

(56) References Cited

U.S. PATENT DOCUMENTS

| | | | | |
|---|---|---|---|---|
| 6,134,126 A | * | 10/2000 | Ikekame | H02J 3/01 307/105 |
| 6,388,451 B1 | * | 5/2002 | Burba | B60L 3/0069 323/315 |

* cited by examiner

*Primary Examiner* — Arun Williams
(74) *Attorney, Agent, or Firm* — Imperium Patent Works; Amir V. Adibi

(57) ABSTRACT

A system includes a power source, a power converter, a leakage current cancelation circuit, a load, and a ground node. The power converter is coupled to the power source and supplies the load. During operation of the power converter, a common mode current flows from the load to the ground node via a leakage capacitance. The leakage current cancelation circuit receives at least one signal indicative of the common mode current and generates a leakage cancelation current that is injected into at least one node of the system. The leakage cancelation current has a magnitude opposite a magnitude of the common mode current. For example, the leakage current cancelation circuit receives supply voltage signals output by the power converter, and generates and supplies the leakage cancelation current onto input nodes of the power converter such that a current level on the ground node is between −3.0 milliamperes and +3.0 milliamperes.

22 Claims, 30 Drawing Sheets

LEAKAGE CURRENT CANCELATION CIRCUIT

LEAKAGE CURRENT CANCELATION CIRCUIT

LEAKAGE CURRENT CANCELATION CIRCUIT

LEAKAGE CURRENT CANCELATION CIRCUIT
(ANOTHER EMBODIMENT)

LEAKAGE CURRENT CANCELATION CIRCUIT
(ANOTHER EMBODIMENT)

LEAKAGE CURRENT CANCELATION CIRCUIT
(ANOTHER EMBODIMENT)

$$\text{LEAKAGE CANCELATION CURRENT} = -C_{POS} \times \frac{dV_{POS}}{dT} + -C_{NEG} \times \frac{dV_{NEG}}{dT}$$

MICROCONTROLLER AND CURRENT REFERENCE
GENERATOR CIRCUIT

CURRENT REFERENCE GENERATOR CIRCUIT

CONFIGURED BY FIRST CONTROL SIGNAL 403

$$C\_POS = R\_POS \times \boxed{G\_POS} \times G\_SUM \times C\_DIFF \times R\_DIFF \times G\_DIFF$$

321

$$C\_NEG = R\_NEG \times \boxed{G\_NEG} \times G\_SUM \times C\_DIFF \times R\_DIFF \times G\_DIFF$$

322

CONFIGURED BY SECOND CONTROL SIGNAL 404

LEAKAGE CAPACITANCE EQUATIONS

CURRENT CONTROLLED FEEDBACK CIRCUIT

CURRENT CONTROLLED FEEDBACK CIRCUIT

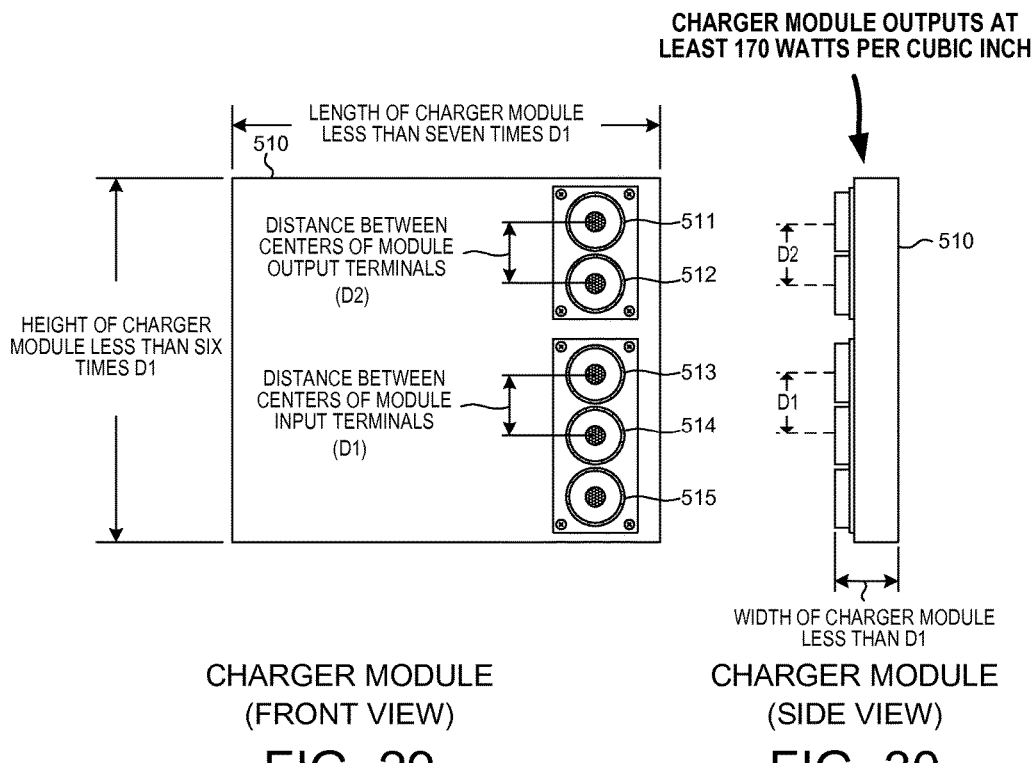
CHARGER MODULE
(FRONT VIEW)
FIG. 29
CHARGER MODULE
(SIDE VIEW)
FIG. 30
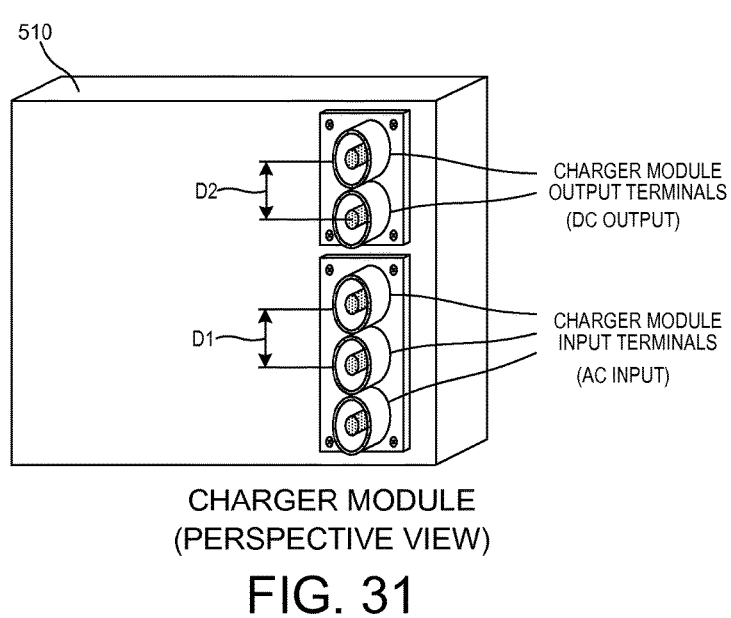
CHARGER MODULE
(PERSPECTIVE VIEW)
FIG. 31

CHARGER MODULE
(ANOTHER EMBODIMENT)

CURRENT REFERENCE GENERATOR CIRCUIT
(ALTERNATE EMBODIMENT)

GENERATING LEAKAGE CANCELING CURRENT IN ELECTRIC VEHICLE CHARGING SYSTEMS

CROSS REFERENCE TO RELATED APPLICATION

This application claims the benefit under 35 U.S.C. §119 of provisional application Ser. No. 62/042,696, entitled "Generating Leakage Canceling Current In Electric Vehicle Charging Station System," filed Aug. 27, 2014. The subject matter of provisional application Ser. No. 62/042,696 is incorporated herein by reference.

TECHNICAL FIELD

The present disclosure relates generally to power systems involving power converters, and more specifically to methods for charging electric vehicles.

BACKGROUND INFORMATION

An electric vehicle typically includes energy storage systems that store electrical energy, such as battery packs. Power circuitry within the electric vehicle uses energy stored in the battery packs to drive an electric motor of the electric vehicle. After the energy stored in the battery packs has been depleted, the battery packs must be charged. An electric vehicle charge station couples the power circuitry of the electric vehicle to an Alternating Current (AC) power source to charge the battery packs.

Electric vehicle charging stations usually must comply with safety regulations and standards because of the hazardous voltage and current levels available at the AC power source to the power circuitry of the electric vehicle. UL 2231 defines standards for electric vehicle charging stations and for protection devices in the charging stations. One type of protection device commonly found in a charging station is a Ground Fault Interrupter (GFI) circuit. If the GFI circuit detects imbalanced current on the charging conductors, then the GFI circuit disables the charging station and the electric vehicle battery packs stop charging. This requirement limits the common mode capacitance of vehicle circuits to a low value, which can be difficult to achieve for some vehicle designs.

SUMMARY

A system includes a power source, a power converter, a leakage current cancelation circuit, a load, and a ground node. The power converter is coupled to the power source and supplies the load. During operation of the power converter, a common mode current flows from the load to the ground node via a common mode capacitance. The common mode current is also referred to as a "leakage current", and the common mode capacitance is also referred to as a "leakage capacitance". Under certain conditions, the leakage current that flows on the ground node is undesirable. To mitigate these undesirable effects, the leakage current cancelation circuit generates a leakage cancelation current. The leakage cancelation current has a magnitude opposite the leakage current such that an instantaneous sum of the leakage cancelation current and the leakage current is substantially near zero.

To generate the leakage cancelation current, the leakage current cancelation circuit receives at least one signal indicative of a common mode current. The at least one signal indicative of the common mode current is received from: one or multiple input nodes of the power converter, one or multiple output nodes of the power converter, or the ground node. The leakage cancelation current uses at least one signal indicative of the common mode current to generate the leakage cancelation current. After the leakage cancelation current is generated, the leakage cancelation current is supplied onto a node of the system thereby causing net current on the power terminals to remain substantially near zero during operation of the power converter. The leakage cancelation current may be supplied onto: one or multiple input nodes of the power converter, one or multiple output nodes of the power converter, or the ground node.

In one example, a novel leakage current cancelation circuit is employed in an electric vehicle charging system. The leakage current cancelation circuit is part of a charger module that includes a power converter, the leakage current cancelation circuit, a plurality of input terminals, a plurality of output terminals, and ground terminals. To charge the energy storage system disposed within the electric vehicle, the electric vehicle is plugged into an electrical vehicle charging station to initiate a charging operation. During the charging operation, the charger module receives an Alternating Current (AC) supply onto the AC input terminals, and the charger module generates and outputs positive and negative Direct Current (DC) supply signals onto the output terminals. The DC supply signals are supplied to circuitry internal to the electric vehicle, such as the energy storage system.

During the charging operation, if a common mode current (or leakage current) flows from circuitry within the electric vehicle onto the ground node such that a GFI circuit of the charging station detects imbalanced current on the charging conductors, then the GFI circuit disables the charging station and the electric vehicle stops charging. Such flow of leakage current is undesirable because the electric vehicle will not charge if the GFI circuit trips and disables charging. The leakage current cancelation circuit generates and supplies a leakage cancelation current so that the leakage current is canceled and no imbalanced current on the charging conductors is detected by the GFI circuit during normal charging conditions. Normal charging conditions is used to refer to a charging condition during which no short circuit exists within the internal circuitry of the electric vehicle, no short circuit exists between the high-voltage conductors and earth ground, and the internal circuitry of the electric vehicle is operating as intended by the manufacturer. Internal circuitry includes any electronic component disposed within the electric vehicle, such as the power converter, motor inverters, system loads, or battery packs. If a short circuit condition exists, then the GFI circuit will trip and charging operation will be disabled to prevent damage to the electric vehicle circuitry. The leakage current cancelation circuit will not prevent the GFI circuit from tripping during such a short circuit condition.

The leakage current cancelation circuit comprises a leakage cancelation current generator and a charge injection circuit. In this example, the leakage cancelation current generator includes a microcontroller, a current reference generator circuit, and a current controlled feedback circuit. During charging operation, the current reference generator circuit receives a DC+ supply voltage signal output by the power converter onto a first input node and receives a DC− supply voltage signal output by the power converter onto a second input node. The DC+ and DC− supply voltage signals are signals indicative of the common mode current. The current reference generator circuit is controlled by the microcontroller to generate a current reference voltage signal. The current controlled feedback circuit receives the current reference voltage signal and generates the leakage cancelation current. The charge injection circuit supplies the generated leakage cancelation current onto AC input nodes of the power converter. Current on the ground node is substantially near zero due to the injected leakage cancelation current. In one example, current on the ground node is between −3.0 milliamperes and +3.0 milliamperes during charging operation under normal conditions.

In accordance with one novel aspect, the charger module is non-isolated from the electric vehicle charging station and power source. Accordingly, the charger module, the electric vehicle charging station, the circuitry internal to the electric vehicle, and the power source share a common ground. Isolated charger modules that include inductors, transformers, or similar type of magnetic devices are well known in the art. However, such isolated charger modules are expensive and prohibitively costly in some applications. In addition, isolated charger modules tend to be large and difficult to install in some vehicles. The non-isolated charger module, on the other hand, includes no such inductors, transformers, or magnetic devices. The power converter also does not include any inductor, transformer, or magnetic device. No inductor, transformer, or magnetic device is present in a power conversion path of the power converter. No inductor, transformer, or magnetic device is directly coupled to an output node of the power converter. This reduces the number of circuit components and complexity required to manufacture the power converter. As a result, the non-isolated charger module is significantly cheaper to manufacture than traditional isolated charger modules. Moreover, the non-isolated charger module is smaller than traditional isolated charger modules thereby yielding at least one-hundred and seventy watts of output per cubic inch of volume of the charger module.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 29 is a front view of charger module 231.

FIG. 30 is a side view of charger module 231.

FIG. 31 is a perspective view of charger module 231.

DETAILED DESCRIPTION

Reference will now be made in detail to some embodiments of the invention, examples of which are illustrated in the accompanying drawings.

Figure 1:
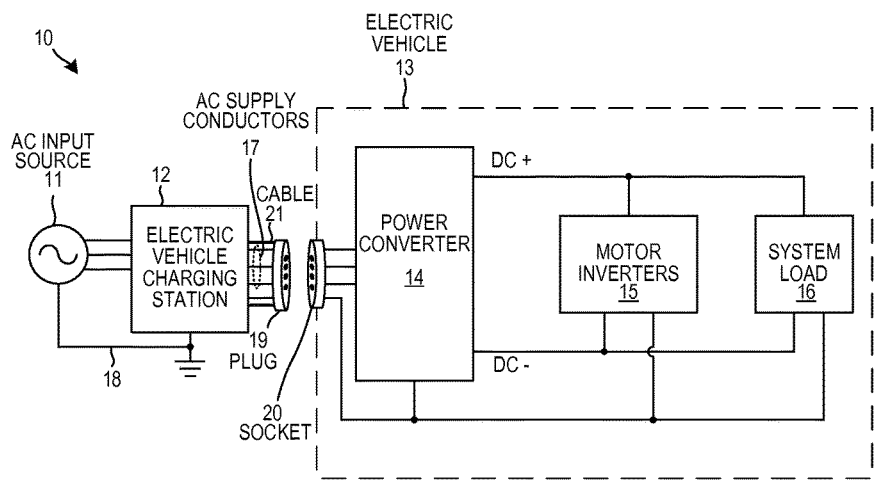
FIG. 1 is a high level diagram of an electric vehicle charging system 10.

FIG. 1 is a high level diagram of an electric vehicle charging system 10. Electric vehicle charging system 10 includes an Alternating Current (AC) input source 11, an electric vehicle charging station 12, and an electric vehicle 13. In this example, electric vehicle charging station 12 is a CS-100 electric vehicle charging station available from ClipperCreek, Inc., located at 11850 Kemper Rd. #E, Auburn, Calif. 95603. In another example, electric vehicle charging station 12 is an Evr-Green 400 Electric Vehicle Charging Station available from Leviton Mfg. Company Inc., located at 201 North Service Rd., Melville, N.Y. 11747. The electric vehicle 13 comprises a power converter 14, motor inverters 15, and a system load 16. Many additional components involved in the structure and operation of electric vehicle 13 are excluded for explanatory purposes.

Charging station 12 receives three-phase AC supply voltages from the AC input source 11 and generates charge currents. The charge currents are supplied onto a cable 21 comprising AC supply conductors 17 and a ground conductor 18. An end of the cable has a plug 19 that is insertable into a socket 20 of electric vehicle 13. After plug 19 is inserted into socket 20 of electric vehicle 13, battery packs (not shown) disposed within electric vehicle 13 are charged. For additional information on the structure and operation of the electric vehicle charging station 12, see: (1) U.S. patent publication number 2014/0015487 entitled "Electric Vehicle Supply Equipment," filed on Sep. 12, 2013; (2) U.S. patent publication number 2012/0206100 entitled "Electric Vehicle Supply Equipment," filed on Apr. 25, 2012; (3) U.S. patent publication number 2012/0091961 entitled "Electric Vehicle Supply Equipment With Storage Connector," filed on Dec. 21, 2011; (4) U.S. patent publication number 2011/0169447 entitled "Electric Vehicle Supply Equipment," filed on Jan. 11, 2010; and (5) U.S. Pat. No. 8,558,504 entitled "Electric Vehicle Supply Equipment With Timer," filed on Jun. 23, 2010 (the entire subject matter of each of these patent documents is incorporated herein by reference).

Figure 2:
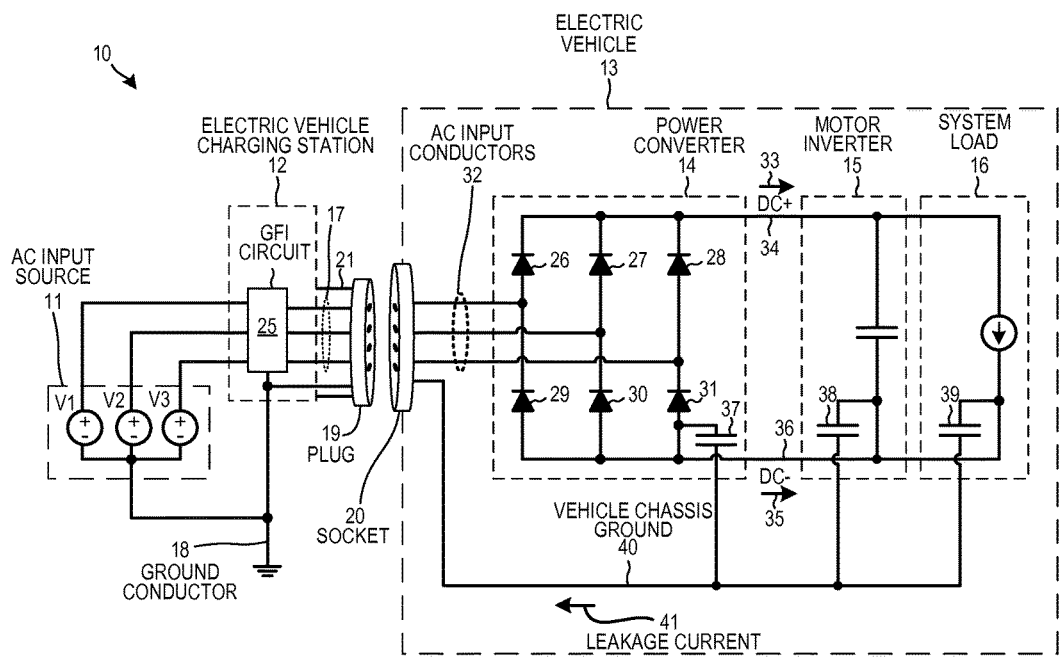
FIG. 2 is a more detailed diagram of electric vehicle charging system 10 of FIG. 1.

FIG. 2 is a more detailed diagram of electric vehicle charging system 10 of FIG. 1. Electric vehicle charging system 10 includes a Ground Fault Interrupter (GFI) circuit 25 that detects current on ground conductor 18. In this example, power converter 14 is a three-phase rectifier circuit having diodes 26, 27, 28, 29, 30, and 31. Three-phase rectifier circuit 14 is coupled to receive AC supply voltages from AC input conductors 32 and generates a positive Direct Current (DC) voltage signal 33 on DC+ conductor 34 and a negative DC voltage signal 35 on DC− conductor 36. DC+ conductor 34 is also referred to as a "positive supply rail", a "positive voltage rail", a "DC+ rail", a "positive supply voltage", and a "positive rail". Similarly, DC− conductor 36 is also referred to as a "negative supply rail", a "negative voltage rail", a "DC− rail", a "negative supply voltage", and a "negative rail". Positive and negative DC voltage conductors 34 and 36 supply motor inverter 15 and other circuitry represented by system load 16 of electric vehicle 13.

Capacitances 37, 38, and 39 are parasitic or EMI filter capacitances between power electronics conductors of electric vehicle 13 and vehicle chassis ground 40. A sum total of capacitances 37, 38, and 39 is referred to as a common mode capacitance of system 10. Common mode capacitance is also referred to as a "leakage capacitance". The term "leakage capacitance" is used interchangeably with the term "common mode capacitance" throughout the instant application. A common mode current (CMC) 41 flows from circuitry of electric vehicle 13 to vehicle chassis ground 40 via capacitances 37, 38, and 39. Common mode current 41 is also referred to as "leakage current". The term "leakage current" is used interchangeably with the term "common mode current" throughout the instant application. During charging of electric vehicle 13, plug 19 is connected to socket 20 such that AC supply conductors 17 are electrically coupled to AC input conductors 32 and ground conductor 18 is electrically coupled to vehicle chassis ground 40. Leakage current 41 flows from circuitry of electric vehicle 13 (for example, three-phase rectifier 14, motor inverter 15, and system load 16) to vehicle chassis ground 40 via capacitances 37, 38, and 39, through socket 20, through plug 19, and onto ground conductor 18.

GFI circuit 25 of electric vehicle charging station 12 is coupled to detect a current level of leakage current 41 flowing on ground conductor 18. If GFI circuit 25 determines that a current level of leakage current 41 exceeds a pre-determined threshold current level, then the GFI circuit 25 disables charging station 12 thereby stopping charging of battery packs within electric vehicle 13. GFI circuit 25 operates in this fashion to protect the circuitry within electric vehicle 13. For example, if a electrical short is present within circuitry of electric vehicle 13, then during charging, the current level of the leakage current 41 on ground node 18 may spike exceeding the pre-determined threshold current level and preventing further damage to the circuitry within electric vehicle 13. Unfortunately, even when the circuitry within electric vehicle 13 is operating as desired, the leakage current 41 may exceed the pre-determined threshold current level causing electric vehicle charging station 12 to cease charging.

Figure 3:
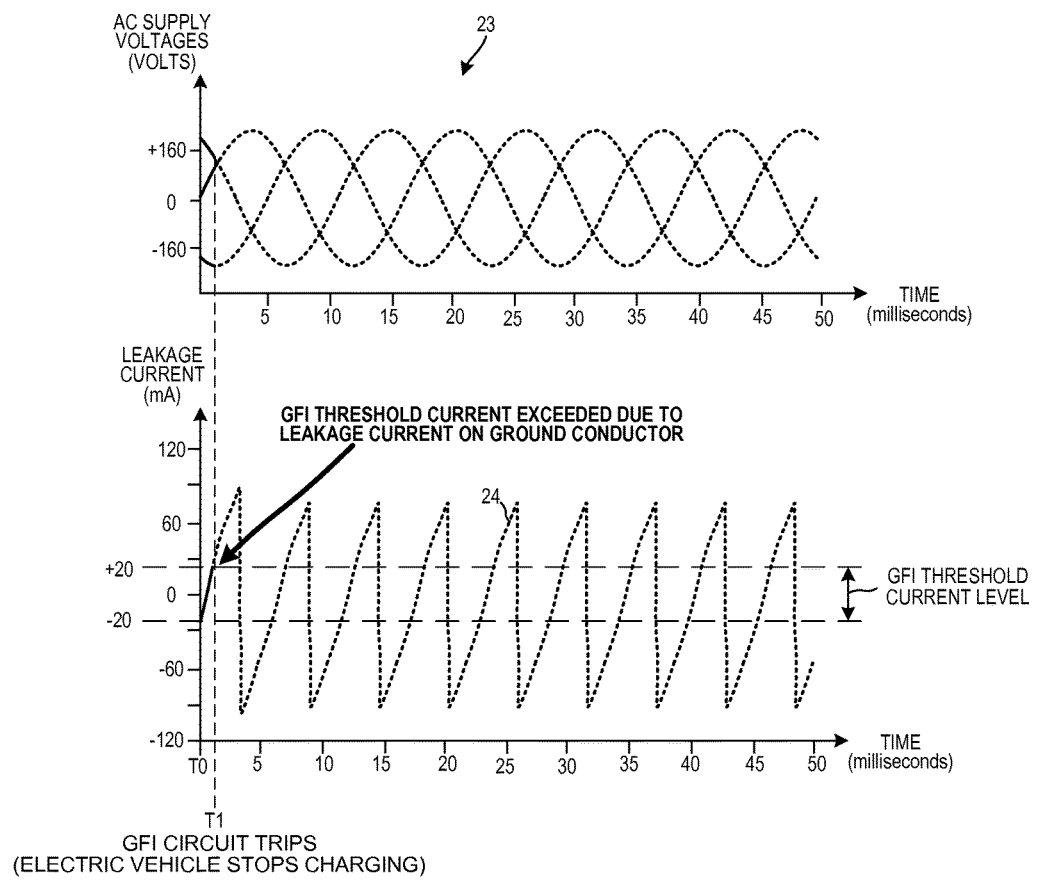
FIG. 3 are waveform diagrams of the AC supply voltages and leakage current 41 during charging of electric vehicle 13.

FIG. 3 are waveform diagrams of the AC supply voltages and leakage current 41 during charging of electric vehicle 13. Waveforms 23 are the AC supply voltages on AC supply conductors 17 and AC input conductors 32 when electric vehicle 13 is plugged into charging station 12 during charging. The AC supply voltages are supplied from AC input source 11, through electric vehicle charging station 12, and onto three-phase rectifier 14 of electric vehicle 13 via cable 21, plug 19, and socket 20. Waveform 24 is leakage current 41 on vehicle chassis ground conductor 40 and ground conductor 18 during charging. In this example, GFI circuit 25 of charging station 12 is configured to interrupt charging when the current level of leakage current 41 exceeds twenty milliamps. Charging operation begins at time T0. At time T1, leakage current 41 exceeds the twenty milliamp threshold current and GFI circuit 25 of charging station 12 trips causing charging to be disabled. Waveforms 23 and 24 are dashed after time T1 showing that the electric vehicle is no longer charging.

Figure 4:
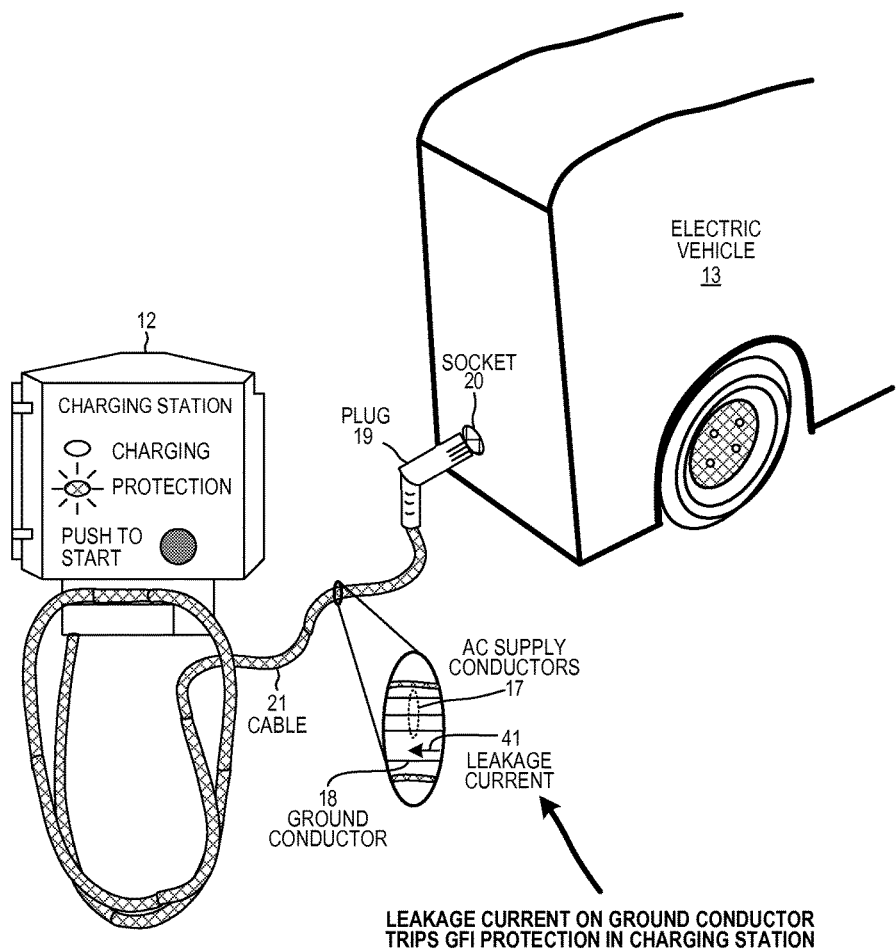
FIG. 4 is a perspective diagram of charging station 12 that includes cable 21 and plug 19.

FIG. 4 is a perspective diagram of charging station 12 that includes cable 21 and plug 19. Cable 21 forms a protective enclosure around AC supply conductors 17, ground conductor 18, and additional signal conductors (not shown). To initiate charging, plug 19 is inserted into socket 20 of electric vehicle 13. As explained above, if GFI circuit 25 detects that the current level of leakage current 41 on ground conductor 18 exceeds the pre-determined threshold current level, then GFI circuit 25 disables charging station 12 and charging ceases.

Figure 5:
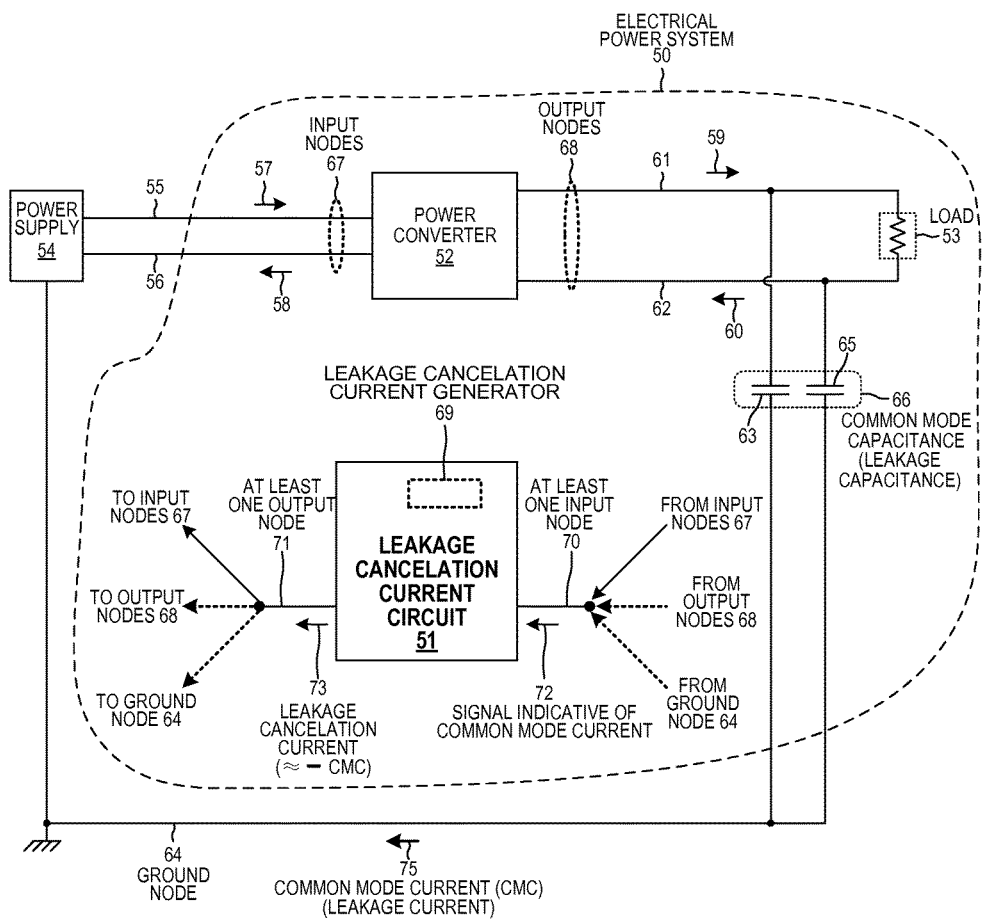
FIG. 5 is a diagram of an electrical power system 50 with a novel leakage current cancelation current 51.

FIG. 5 is a diagram of an electrical power system 50 with a novel leakage current cancelation current 51. Although common mode current may present challenges in charging an electric vehicle, a skilled artisan appreciates that common mode current may be undesirable in many other applications involving power converters. Electrical power system 50 comprises leakage current cancelation circuit 51, a power converter 52, and a load 53. Power converter 52 is coupled to power supply 54 via conductors 55 and 56. Power converter 52 receives supply current signals 57 and 58 from power supply 54 and generates and outputs supply signals 59 and 60. Supply signals 59 and 60 drive load 53 via conductors 61 and 62. A first parasitic capacitance 63 is coupled between conductor 61 and a ground node 64. A second parasitic capacitance 65 is coupled between conductor 62 and the ground node 64. Summing first parasitic capacitance 63 and second parasitic capacitance 65 yields a common mode capacitance 66 of system 50. Reference numeral 67 identifies input nodes of power converter 52, and reference numeral 68 identifies output nodes of power converter 52.

Leakage current cancelation circuit 51 includes a leakage cancelation current generator 69, at least one input node 70, and at least one output node 71. Leakage current cancelation circuit 51 receives at least one signal indicative of common mode current 72 onto at least one input node 70. The at least one signal indicative of common mode current 72 is received from input nodes 67 of power converter 52, from output nodes 68 of power converter 52, or from ground node 64. Typically, two signals indicative of common mode current are received, a first onto a first input node and a second onto a second input node. Leakage cancelation current generator 69 uses the received at least one signal indicative of common mode current 72 to generate at least one leakage cancelation current 73 onto at least one output node 71. The at least one leakage cancelation current 73 is supplied to input nodes 67 of power converter 52, to output nodes 68 of power converter 52, or to ground node 64. Depending on where the leakage cancelation currents, multiple leakage cancelation currents may be generated and supplied onto varying numbers of conductors.

During operation of power converter 52, power converter supply current signals 57 and 58 flow between power converter 52 and power supply 54. Ideally, supply current signal 57 flowing into power converter 52 would have a magnitude equal to a magnitude of supply current signal 58 flowing out of power converter 52. However, due to common mode capacitance 66 of system 50, common mode current or leakage current 75 flows from conductors 61 and 62 to ground node 64 via capacitances 63 and 65. As a result, magnitudes of supply current signal 57 and supply current signal 58 are not equivalent. In typical applications, leakage current 75 is undesirable and is to be minimized.

Leakage current cancelation circuit 51 operates to cancel leakage current 75 by generating and supplying leakage cancelation current 73 onto at least one node of electrical system 50. Leakage cancelation current 73 has a magnitude opposite that of leakage current 75 such that an instantaneous sum of leakage current 75 and leakage cancelation current 73 is substantially zero. In one example, the instantaneous sum of leakage current 75 and leakage cancelation current 73 during charging operation is within a range having a lower bound of −5.0 milliamperes and an upper bound of +5.0 milliamperes. In another example, the instantaneous sum of leakage current 75 and leakage cancelation current 73 during charging operation is within a range having a lower bound of −3.0 milliamperes and an upper bound of +3.0 milliamperes. Leakage cancelation current 73 may also be referred to as a "leakage nulling current". Various embodiments of leakage current cancelation circuit 51 and how each embodiment operates in the electrical power system are set forth below.

Figure 6:
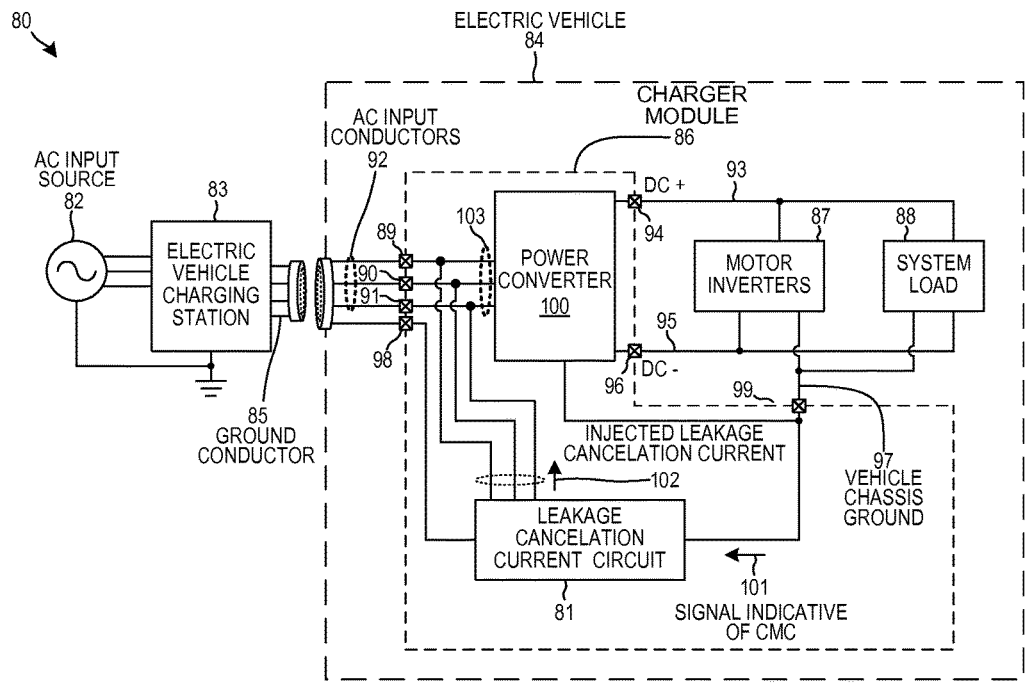
FIG. 6 is a diagram of electric vehicle charging system 80 that employs a novel leakage current cancelation circuit 81.

FIG. 6 is a diagram of electric vehicle charging system 80 that employs a novel leakage current cancelation circuit 81. Electric vehicle charging system 80 includes an AC input source 82, an electric vehicle charging station 83, an electric vehicle 84, and a ground conductor 85. Electric vehicle 84 comprises a novel charger module 86, motor inverters 87, and a system load 88. When electric vehicle 84 is coupled to electric vehicle charging station 83 in a charging mode, charger module 86 receives a three phase AC supply from electric vehicle charging station 83 onto terminals 89, 90, and 91 via AC input conductors 92. Charger module 86 outputs a positive DC supply voltage onto DC+ conductor 93 via terminal 94, and a negative DC supply voltage onto DC− conductor 95 via terminal 96. Ground conductor 85 is coupled to vehicle chassis ground 97 via ground terminals 98 and 99.

Charger module 86 includes a power converter 100 and the leakage current cancelation circuit 81. In this example, power converter 100 is an AC-to-DC three phase rectifier circuit that receives an AC supply and outputs a DC supply used to power internal circuitry of electric vehicle 84. Leakage current cancelation circuit 81 receives a signal indicative of common mode current 101 from vehicle chassis ground 97 via ground terminal 99. In this example, the signal indicative of common mode current 101 is the leakage current present on vehicle chassis ground 97. Leakage current cancelation circuit 81 generates leakage cancelation currents 102 from the received signal indicative of common mode current 101 and supplies leakage cancelation currents 102 onto AC input nodes 103. As a result of supplying leakage cancelation currents 102 onto AC input nodes 103, current levels on ground conductor 85 remain below a pre-determined current level preventing charging station 83 from disabling the charging operation.

Figure 7:
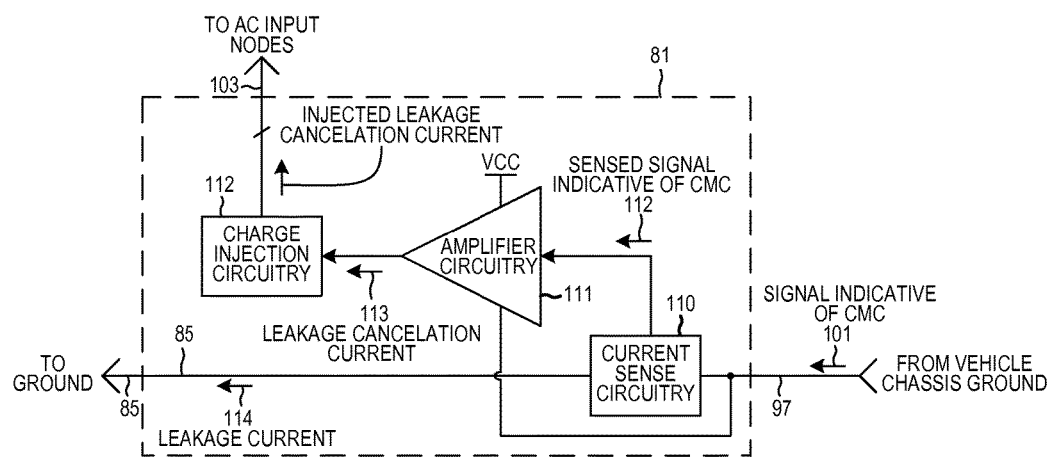
FIG. 7 is a block diagram of leakage current cancelation circuit 81.

FIG. 7 is a block diagram of leakage current cancelation circuit 81. Leakage current cancelation circuit 81 includes current sense circuitry 110, amplifier circuitry 111, and charge injection circuitry 112. Current sense circuitry 110 and amplifier circuitry 111 form the leakage cancelation current generator. Current sense circuitry 110 senses signal indicative of common mode current 101 on vehicle chassis ground 97 and generates a sensed leakage current signal 112 that is supplied to amplifier circuitry 111. Amplifier circuitry 111 generates and supplies leakage cancelation current 113 to charge injection circuitry 112. Charge injection circuitry 112 injects leakage cancelation current 113 onto AC input nodes 103. During charging mode, a current level of leakage current 114 on ground conductor 85 is maintained below the predetermined current level of the GFI circuit within charging station 83.

Figure 8:
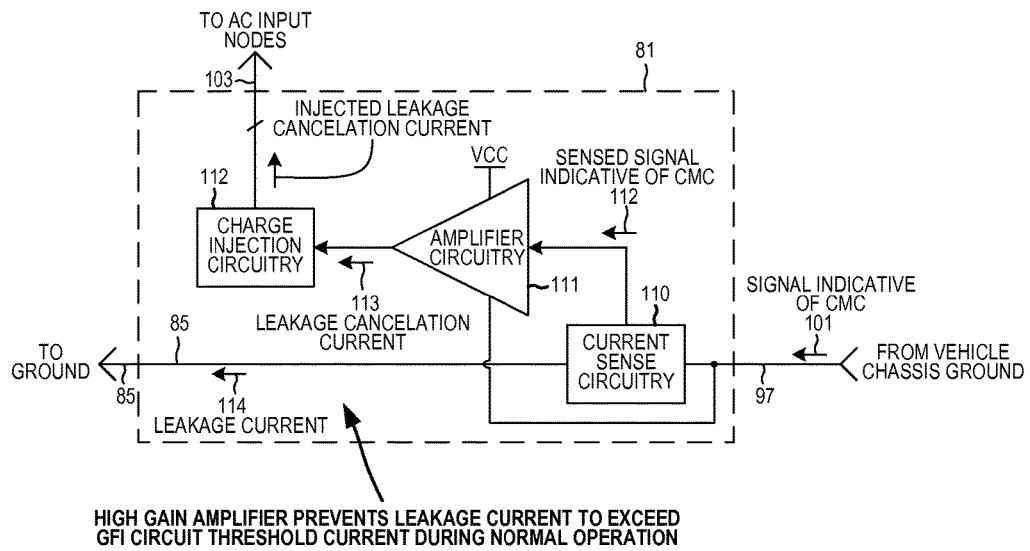
FIG. 8 is another block diagram of leakage current cancelation circuit 81 that shows how leakage current cancelation circuit 81 prevents the GFI circuit within charging station 83 from tripping.

FIG. 8 is another block diagram of leakage current cancelation circuit 81 that shows how leakage current cancelation circuit 81 prevents the GFI circuit within charging station 83 from tripping. Amplifier circuitry 111 is realized as a high gain amplifier. High gain amplifier 111 maintains the current level of leakage current 114 on ground conductor 85 substantially near a zero current level.

Figure 9:
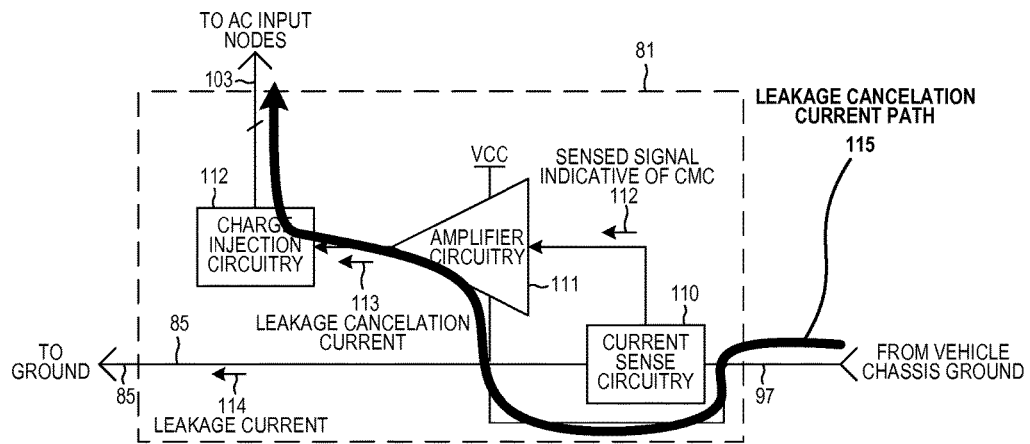
FIG. 9 is another block diagram of leakage current cancelation circuit 81 that shows the current path 115 of the leakage cancelation current.

FIG. 9 is another block diagram of leakage current cancelation circuit 81 that shows the current path 115 of the leakage cancelation current. The leakage current path 115 extends from vehicle chassis ground conductor 97, through amplifier circuitry 111, through charge injection circuitry 112, and onto AC input nodes 103.

Figure 10:
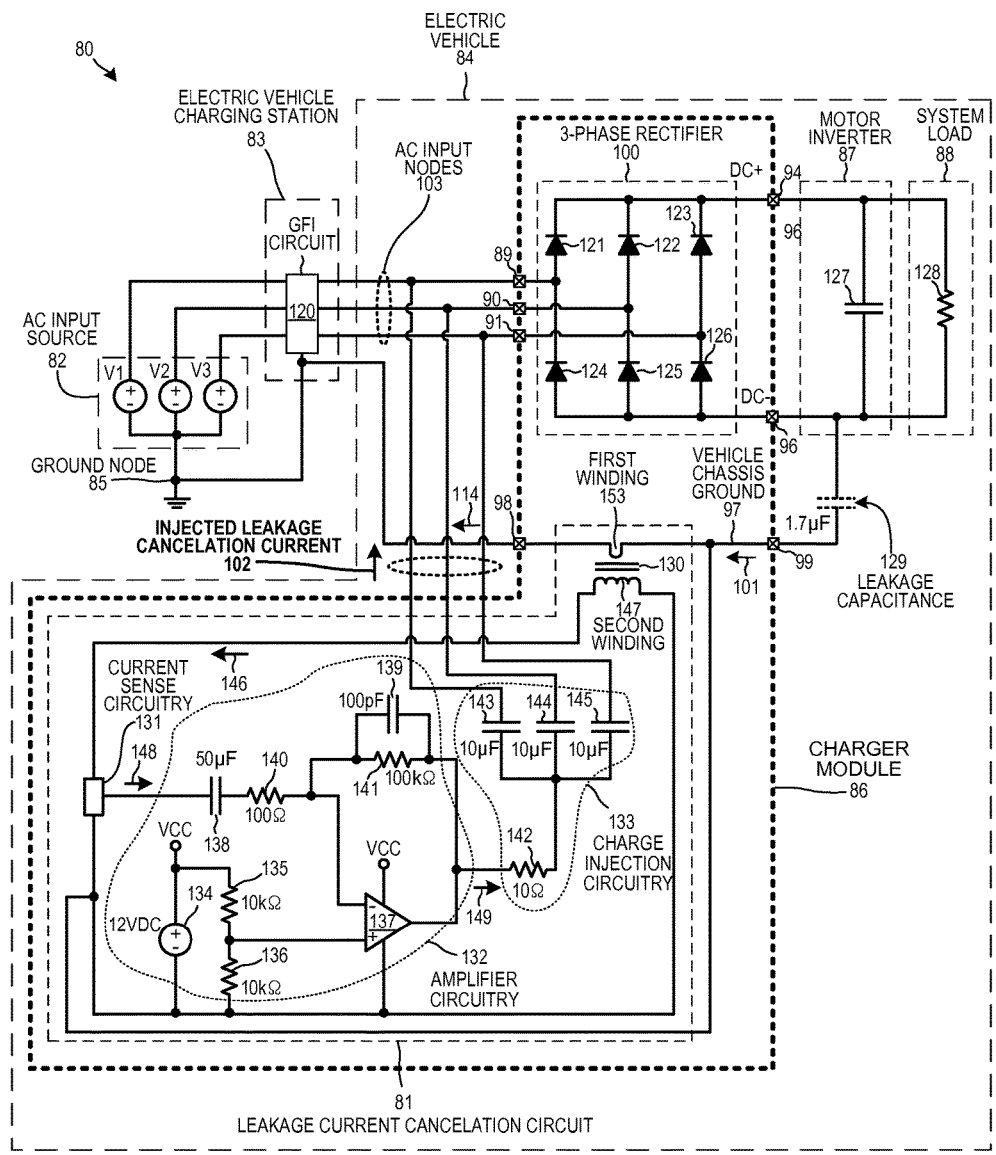
FIG. 10 is a detailed circuit diagram of electric vehicle charging system 80 that includes the novel leakage current cancelation circuit 81.

FIG. 10 is a detailed circuit diagram of electric vehicle charging system 80 that includes the novel leakage current cancelation circuit 81. Electric vehicle charging station 83 includes GFI circuit 120. Typically, a manufacturer of the charging station 83 sets a pre-determined current at which GFI circuit 120 is tripped in compliance with a standard, such as UL 2231. Rectifier 100 includes diodes 121, 122, 123, 124, 125, and 126. Motor inverter 87 includes a capacitor 127 that provides a model of electrical characteristics of the motor inverters. System load 88 includes a resistor 128 that provides a model of electrical characteristics of the load. Parasitic capacitance 129 represents the common mode capacitance of system 80. Leakage current cancelation circuit 81 includes transformer 130, current sense circuitry 131, amplifier circuitry 132, and charge injection circuitry 133. Transformer 130, current sense circuitry 131, and amplifier circuitry 132 form the leakage cancelation current generator. Amplifier circuitry 132 includes a voltage source 134, resistive divider network 135 and 136, amplifier 137, capacitors 138 and 139, and resistors 140 and 141. Charge injection circuitry 133 includes resistor 142 and capacitors 143, 144, and 145. The transformer has a first winding 153 and a second winding 147.

When electric vehicle 84 is coupled to charging station 83 in a charging mode, current sense circuitry 131 senses a signal 146 proportional to the signal indicative of common mode current 101 through second winding 147 of transformer 130. Current sense circuitry 131 outputs signal 148 onto amplifier circuitry 132. Amplifier circuitry 132 generates a leakage cancelation current 149 from received signal 148, and amplifier circuitry 132 injects leakage cancelation current 102 onto AC input nodes 103 via charge injection circuitry 133.

Figure 11:
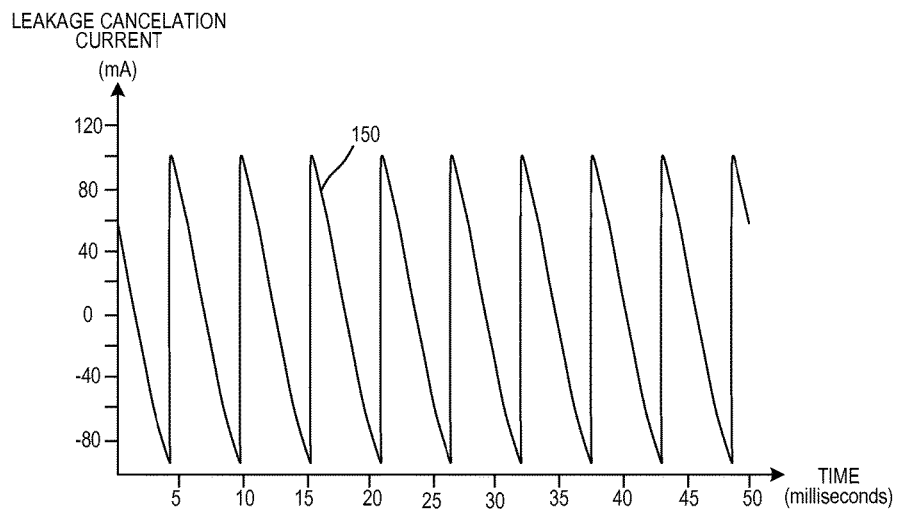
FIG. 11 is a diagram of a waveform 150 of leakage cancelation current 149 that is to be injected onto AC input nodes 103.
Figure 12:
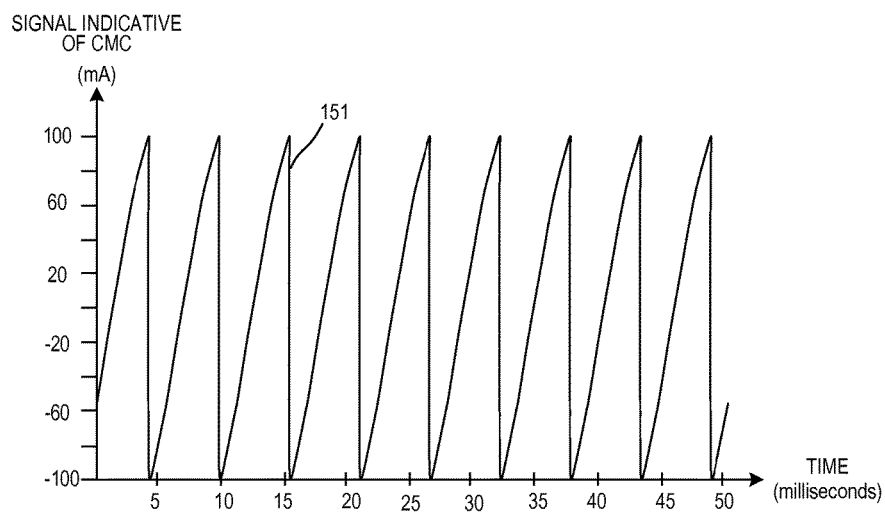
FIG. 12 is a diagram of waveform 151 of the signal indicative of common mode current 101.
Figure 13:
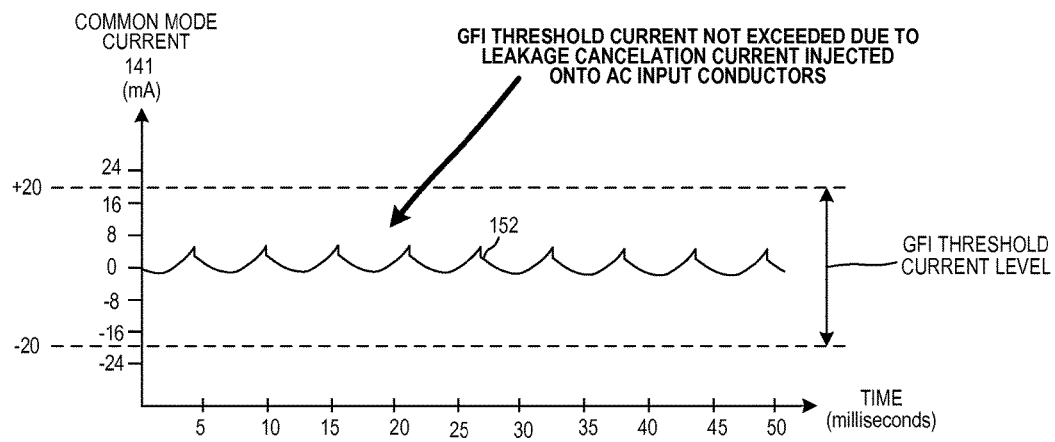
FIG. 13 is a diagram of waveform 152 of common mode current 141 that flows on ground conductor 85 during charging mode operation.
Figure 14:
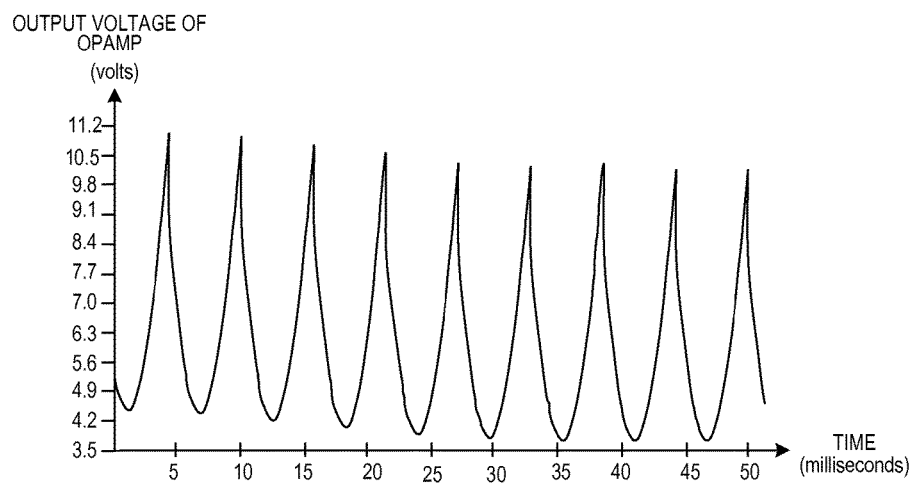
FIG. 14 is a diagram of output voltage of operational amplifier 137.

FIGS. 11-14 are waveform diagrams along various nodes of system 80 during charging mode of operation. FIG. 11 is a diagram of a waveform 150 of leakage cancelation current 149 that is to be injected onto AC input nodes 103. FIG. 12 is a diagram of waveform 151 of the signal indicative of common mode current 101. Waveform 150 is of opposite magnitude of waveform 151 such that an instantaneous sum of both waveforms is approximately zero. FIG. 13 is a diagram of waveform 152 of common mode current 141 that flows on ground conductor 85 during charging mode operation. As shown in FIG. 13, the current level of waveform 152 does not exceed the twenty milliamp GFI pre-determined current level. Because the threshold current is never exceeded, GFI circuit 120 will not disable charging station 83 during when the electric vehicle 84 is charging. FIG. 14 is a waveform diagram of an output voltage of the operational amplifier 137 of FIG. 10.

Figure 15:
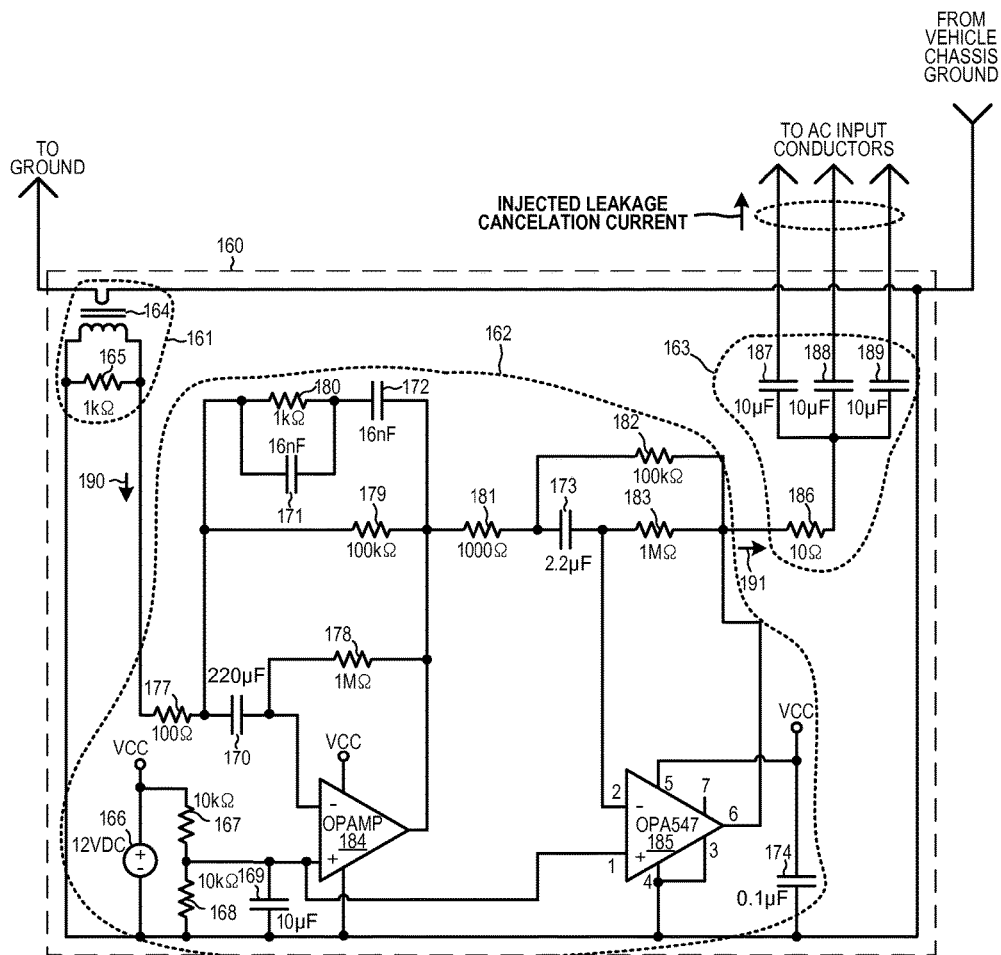
FIG. 15 is a detailed circuit diagram of another embodiment of a leakage current cancelation circuit 160 that may also be employed to supply a leakage cancelation current onto AC input nodes 103.

FIG. 15 is a detailed circuit diagram of another embodiment of a leakage current cancelation circuit 160 that may also be employed to supply a leakage cancelation current onto AC input nodes 103. Leakage current cancelation circuit 160 includes current sense circuitry 161, amplifier circuitry 162, and charge injection circuitry 163. Current sense circuitry 161 and amplifier circuitry 162 form the leakage cancelation current generator. Current sense circuitry 161 includes a transformer 164 and resistor 165. Amplifier circuitry 162 comprises a voltage source 166, resistive divider network 167 and 168, capacitors 169, 170, 171, 172, 173, and 174, resistors, 177, 178, 179, 180, 181, 182, and 183, and amplifiers 184 and 185. In this example, amplifier 184 is a LT1126 Dual Decompensated Low Noise, High Speed Precision Operational Amplifier, available from Linear Technology located at 720 Sycamore Dr., Milpitas, Calif. 95035. Amplifier 185 is an OPA547 High-Voltage, High-Current Operational Amplifier available from Texas Instruments Incorporated located at 12500 TI Boulevard, Dallas, Tex. 75243. Charge injection circuit 163 includes resistor 186 and capacitors 187, 188, and 189. The signal indicative of common mode current 101 is sensed by current sense circuit 161. Amplifier circuitry 162 receives sensed signal 190 and generates leakage cancelation current 191 that is injected into AC input nodes 103 via charge injection circuit 163.

Figure 16:
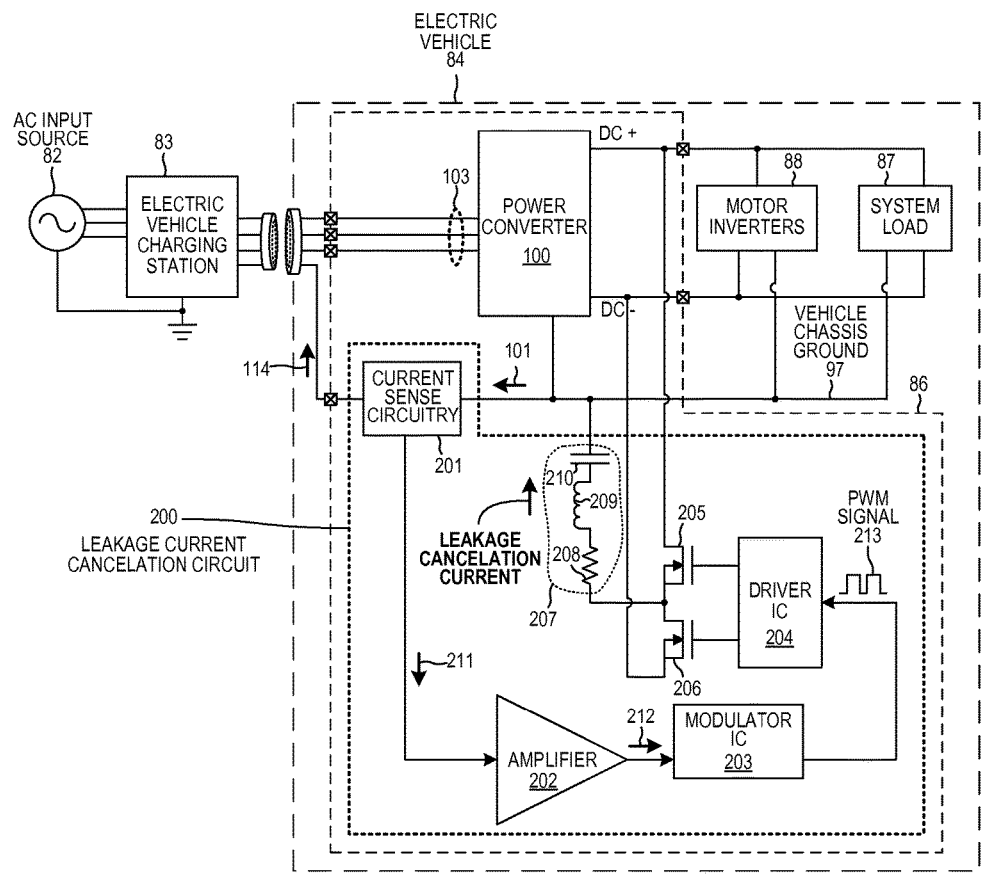
FIG. 16 is a diagram of another embodiment of a leakage current cancelation circuit 200 that may also be employed to supply a leakage cancelation current onto AC input nodes 103.

FIG. 16 is a diagram of another embodiment of a leakage current cancelation circuit 200 that may also be employed to supply a leakage cancelation current onto AC input nodes 103. Leakage current cancelation circuit 200 comprises current sense circuitry 201, amplifier 202, modulator integrated circuit 203, a driver integrated circuit 204, transistors 205 and 206, and a charge injection circuit 207. Current sense circuitry 201, amplifier 202, modulator integrated circuit 203, a driver integrated circuit 204, and transistors 205 and 206 form the leakage cancelation current generator. Charge injection circuit 207 includes a resistor 208, an inductor 209, and a capacitor 210. During charging mode operation, current sense circuitry 201 receives the signal indicative of common mode current 101 on vehicle chassis ground 97 and outputs sense signal 211. Amplifier 202 receives sense signal 211 and supplies an amplified sense signal 212 onto modulator integrated circuit 203. Modulator integrated circuit 203 supplies Pulse Width Modulated (PWM) signal 213 onto driver integrated circuit 204. Driver 204 controls transistors 205 and 206 to switch such that the current level of leakage current 114 is maintained substantially near zero. In one example, transistors 205 and 206 are realized as metal oxide semiconductor field-effect transistors (MOSFETs). In another example, transistors 205 and 206 are realized as insulated-gate bipolar transistors (IGBTs).

Figure 17:
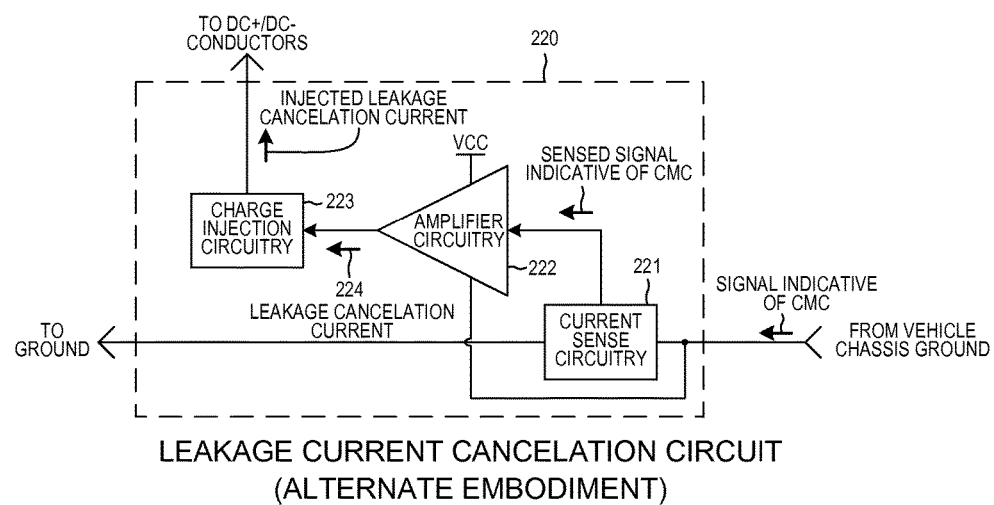
FIG. 17 is a diagram of another embodiment of a leakage current cancelation circuit 220.

FIG. 17 is a diagram of another embodiment of a leakage current cancelation circuit 220. Leakage current cancelation circuit 220 comprises current sense circuitry 221, amplifier circuitry 222, and charge injection circuitry 223. Current sense circuitry 221 and amplifier circuitry 222 form the leakage cancelation current generator. Leakage current cancelation circuit 220 operates in substantially the same fashion as leakage current cancelation circuit 81 of FIG. 6, except that leakage current cancelation circuit 220 is employed in a system that involves a DC-to-DC power converter instead of AC-to-DC power converter 100. In the example of FIG. 17, charge injection circuitry 223 supplies leakage cancelation current 224 onto DC+ and DC− input nodes of the DC-to-DC power converter.

Figures 18, 19:
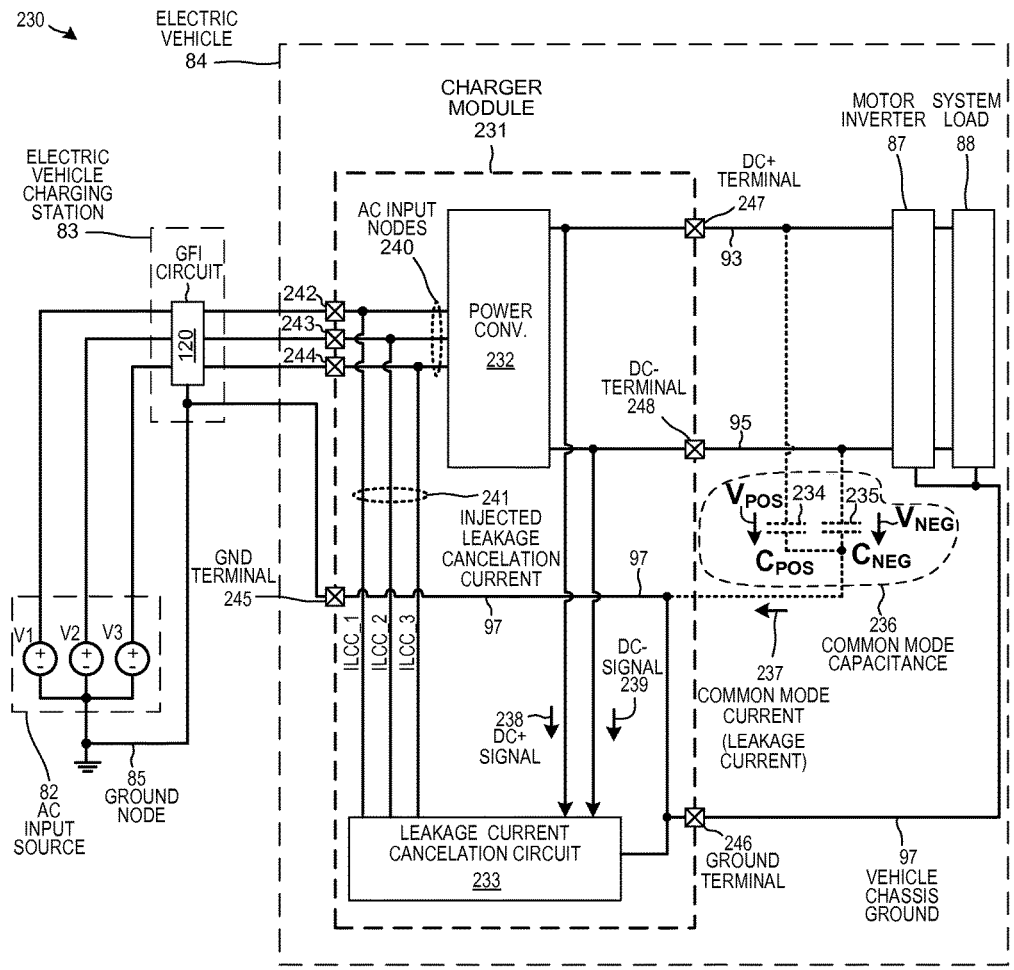
FIG. 18 is a diagram of a system 230 that employs another embodiment of a charger module 231.
FIG. 19 is an equation 250 that shows the relationship between voltages on DC+ terminal 93 and DC− terminal 95, common mode capacitances C_POS and C_NEG, and the leakage cancelation current.

FIG. 18 is a diagram of a system 230 that employs another embodiment of a charger module 231. Charger module 231 includes a power converter 232 and a leakage current cancelation circuit 233. In the example of FIG. 18, leakage capacitance 236 (or common mode capacitance) involves a first parasitic capacitance 234 and a second parasitic capacitance 235. First parasitic capacitance 234 has a capacitance of C_POS and a voltage drop of V_POS, and second parasitic capacitance 235 has a capacitance of C_NEG and a voltage drop of V_NEG. Leakage capacitance 236 of system 230 is equivalent to a sum of capacitances C_POS and C_NEG. Leakage current 237 (or common mode current) flows from positive DC+ conductor 93 and from negative DC− conductor 95 onto vehicle chassis ground 97. In the example of FIG. 18, vehicle chassis ground 97 is directly coupled to ground node 85 without any intervening circuitry or discrete circuit devices. Charger module 231 does not include any transformers, inductors, or any type of magnetic devices.

In accordance with one novel aspect, leakage current cancelation circuit 233 receives a first signal indicative of a common mode current 238 and a second signal indicative of a common mode current 239. First signal indicative of a common mode current 238 is labeled as "DC+ signal" in FIG. 18 and second signal indicative of a common mode current 239 is labeled as "DC− signal" in FIG. 18. Leakage current cancelation circuit 233 a generates leakage cancelation current from the received DC+ signal 238 and DC− signal 239. Leakage current cancelation circuit 233 generates leakage cancelation current without directly sensing the common mode current 237 on vehicle chassis ground 97 or ground node 85. Leakage current cancelation circuit injects the leakage cancelation currents ILCC_1, ILCC_2, and ILCC_3 onto AC input nodes 240 of the power converter 232. Reference numeral 241 identifies the injected leakage cancelation currents.

Charger module 231 is a seven terminal device. Terminals 242, 243, and 244 are AC input terminals that receive AC power from charging station 83. Terminal 245 is a ground terminal that couples vehicle chassis ground 97 to ground node 85. Terminal 246 is another ground terminal that is coupled to vehicle chassis ground 97. Charger module 231 is referred to as "non-isolated" because vehicle chassis ground 97 is coupled to ground node 85 and vehicle chassis ground 97 is not coupled to a separate ground node. Terminal 247 is a DC+ terminal that is coupled to supply a DC+ supply voltage onto DC+ conductor 93. Terminal 248 is a DC− terminal that is coupled to supply a DC− supply voltage onto DC− conductor 95.

FIG. 19 is an equation 250 that shows the relationship between voltages on DC+ terminal 93 and DC− terminal 95, parasitic capacitances C_POS and C_NEG, and the leakage cancelation current. Leakage current cancelation circuit 233 generates the leakage cancelation current in accordance with equation 250. Equation 250 shows that if parasitic capacitances C_POS and C_NEG for electric vehicle 84 are known, then the desired leakage cancelation current may be generated by sensing the voltages on DC+ terminal 93 and DC− terminal 95 during a charging operation and without directly sensing leakage current 237 (or common mode current).

Figure 20:
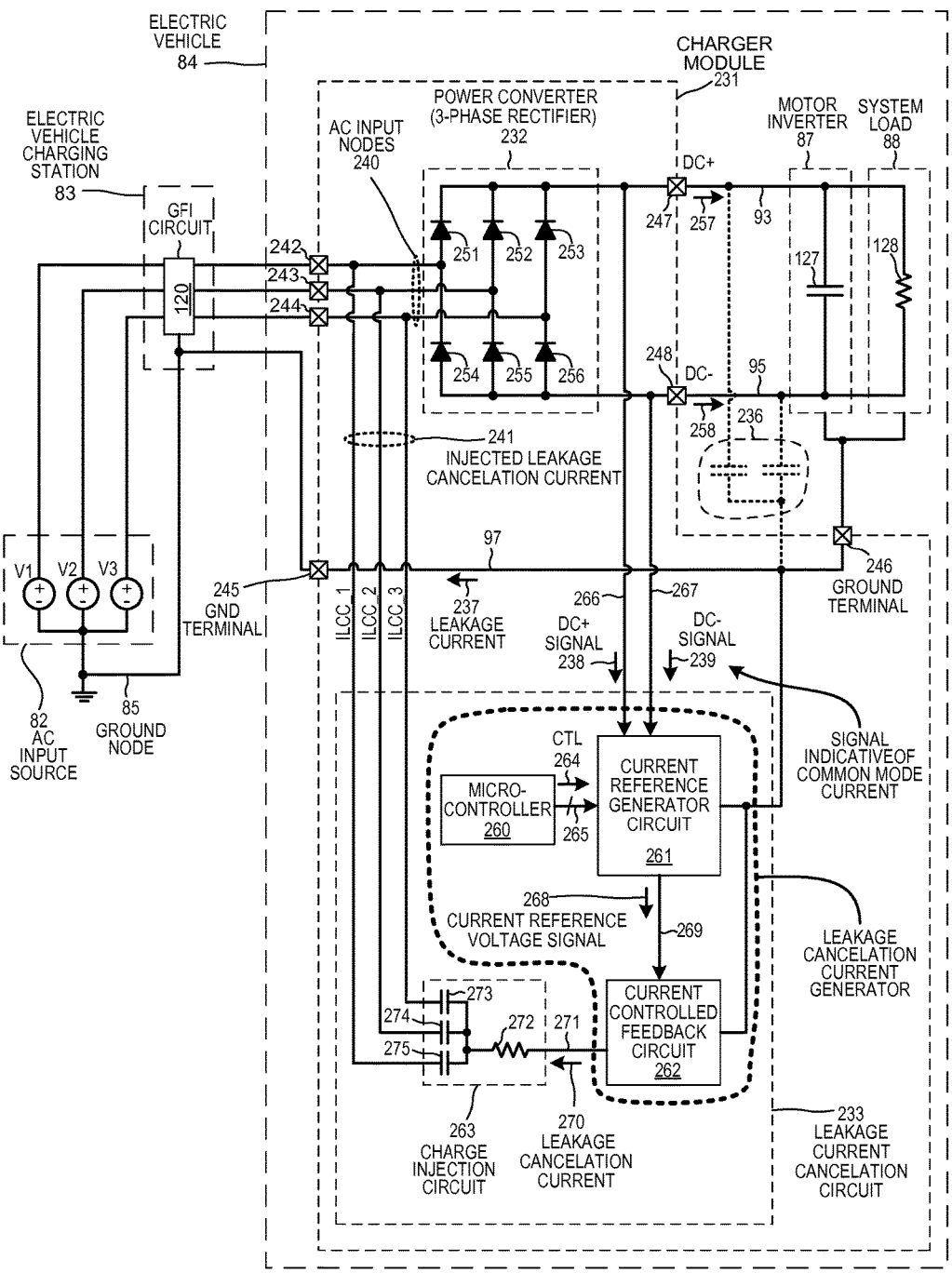
FIG. 20 is a more detailed diagram of the charger module 231.

FIG. 20 is a more detailed diagram of the charger module 231. In this example, power converter 232 is a three-phase rectifier circuit having diodes 251, 252, 253, 254, 255, and 256. Three-phase rectifier circuit 232 is coupled to receive AC supply voltages from AC input conductors 240 and to generate a positive Direct Current (DC) voltage signal 257 on DC+ conductor 93 and a negative DC voltage signal 258 on DC− conductor 95. Positive and negative DC voltage conductors 93 and 95 supply motor inverter 87 modeled by capacitor 127 and system load 88 modeled by resistor 128.

Leakage current cancelation circuit 233 comprises a microcontroller 260, a current reference generator circuit 261, a current controlled feedback circuit 262, and a charge injection circuit 263. Microcontroller 260, current reference generator circuit 261, and current controlled feedback circuit 262 form the leakage cancelation current generator. Microcontroller supplies a multi-bit digital control signal 264 to current reference generator circuit 261 via conductors 265. Multi-bit digital control signal 264 sets a first configurable gain and a second configurable gain of the current reference generator circuit 261 as explained in connection with FIGS. 23 and 24. Current reference generator circuit 261 also receives a DC+ voltage signal 238 via conductor 266 and DC− voltage signal 239 via conductor 267. Current reference generator circuit 261 generates a current reference voltage signal 268 from the received DC+ voltage signal 238, DC− voltage signal 239, and multi-bit digital control signal 264. Current reference voltage signal 268 is supplied onto current controlled feedback circuit 262 via conductor 269. Current controlled feedback circuit 262 generates leakage cancelation current 270 from the received current reference voltage signal 268. Leakage cancelation current 270 is injected onto AC input nodes 240 via conductor 271 and charge injection circuit 263. Charge injection circuit 263 includes a resistor 272 and capacitors 273, 274, and 275. Charge injection circuit 263 supplies the leakage cancelation current onto AC input nodes 240 as three separate currents, ILCC_1, ILCC_2, and ILCC_3.

In accordance with one novel aspect, power converter 232 of charger module 231 does not include any inductors, transformers, or magnetic devices. No inductor, transformer, or magnetic device is present in a power conversion path of power converter 232. For example, no inductor or transformer is coupled between an output node of power converter 232 and DC+ terminal 247 or DC− terminal 248. DC+ signal 257 and DC− signal 258 are supplied directly onto internal circuitry of electric vehicle 84 without any intervening inductor or transformer. No inductor, transformer, or magnetic device is coupled to an output node of power converter 232. Power converter 232 has six and only six diodes 251-256, and no additional circuitry is disposed between an input node and an output node of power converter 232.

Figure 21:
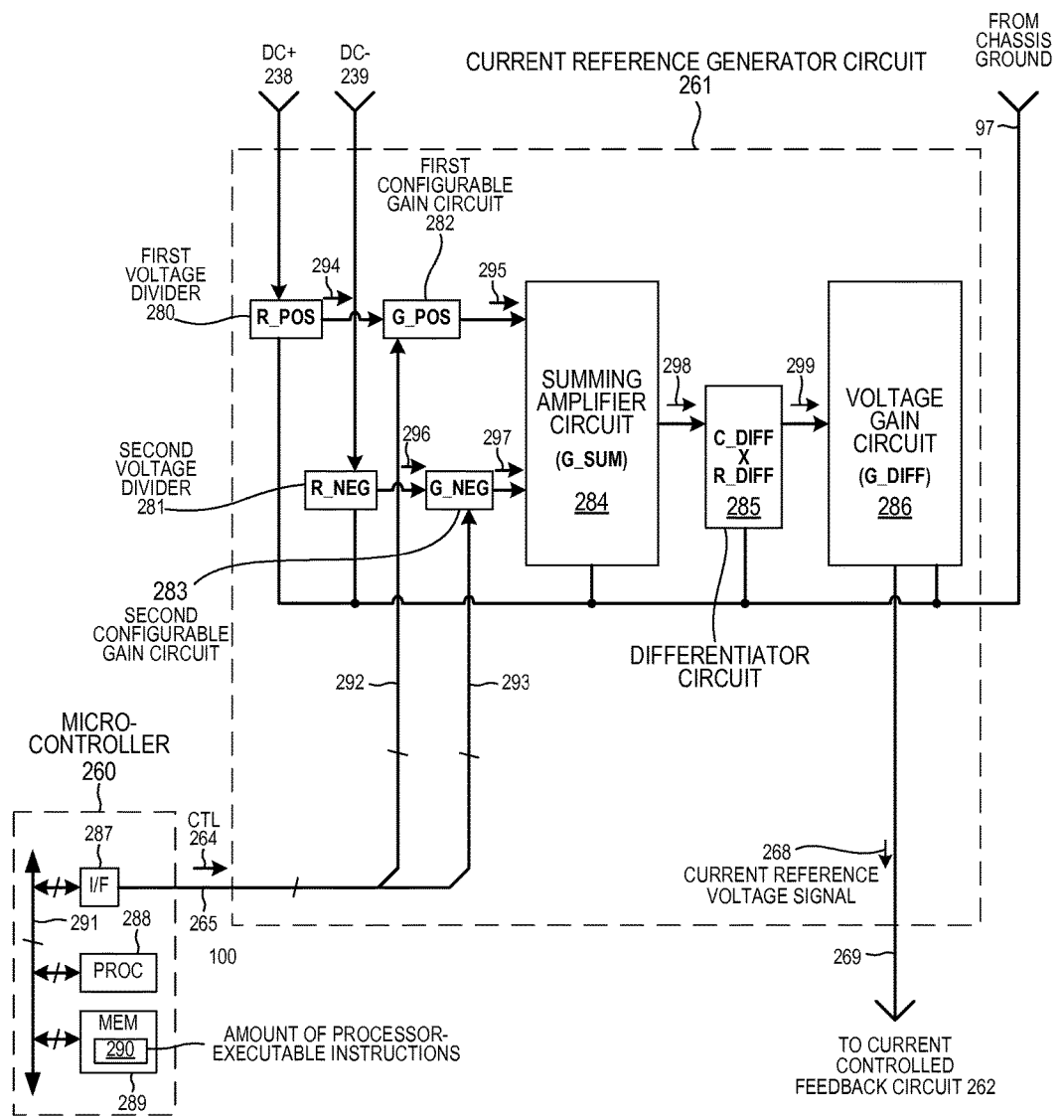
FIG. 21 is a more detailed diagram of the microcontroller 260 and current reference generator circuit 261.

FIG. 21 is a more detailed diagram of the microcontroller 260 and current reference generator circuit 261. Current reference generator circuit 261 includes a first voltage divider 280, a second voltage divider 281, a first configurable gain circuit 282, a second configurable gain circuit 283, summing amplifier circuit 284, differentiator circuit 285, and a voltage gain circuit 286. Microcontroller 260 includes interface circuitry 287, a processor 288, and memory 289. An amount of processor executable instructions 290 is stored in memory 289. Processor 288 reads the amount of processor executable instructions 290 via communication bus 291. Executing instructions 290 cause multi-bit digital control signal 264 to be supplied to current reference generator circuit 261 via conductors 265. A first portion of the multi-bit digital control signal 264 sets first configurable gain circuit 282 to a gain G_POS via conductors 292. A second portion of the multi-bit digital control signal 264 sets second configurable gain circuit 283 to a gain G_NEG via conductors 293. First configurable gain circuit 282 receives signal 294 from first voltage divider 280, voltage amplifies signal 294 by G_POS, and supplies amplified signal 295 onto a first input of summing amplifier circuit 284. Second configurable gain circuit 283 receives signal 296 from second voltage divider 281, voltage amplifies signal 296 by G_NEG, and supplies an amplified signal 297 onto a second input of summing amplifier circuit 284. Summing amplifier circuit 284 sums signals 295 and 297 and voltage amplifies the resulting sum by G_SUM. Summing amplifier circuit 284 supplies amplified signal 298 onto differentiator circuit 285 which in turn outputs signal 299 onto voltage gain circuit 286. Voltage gain circuit 286 voltage amplifies the received signal 299 by G_DIFF and generates current reference voltage signal 268. Voltage gain circuit 286 supplies current reference voltage signal 268 onto current controlled feedback circuit 262 via conductor 269.

Figure 22:
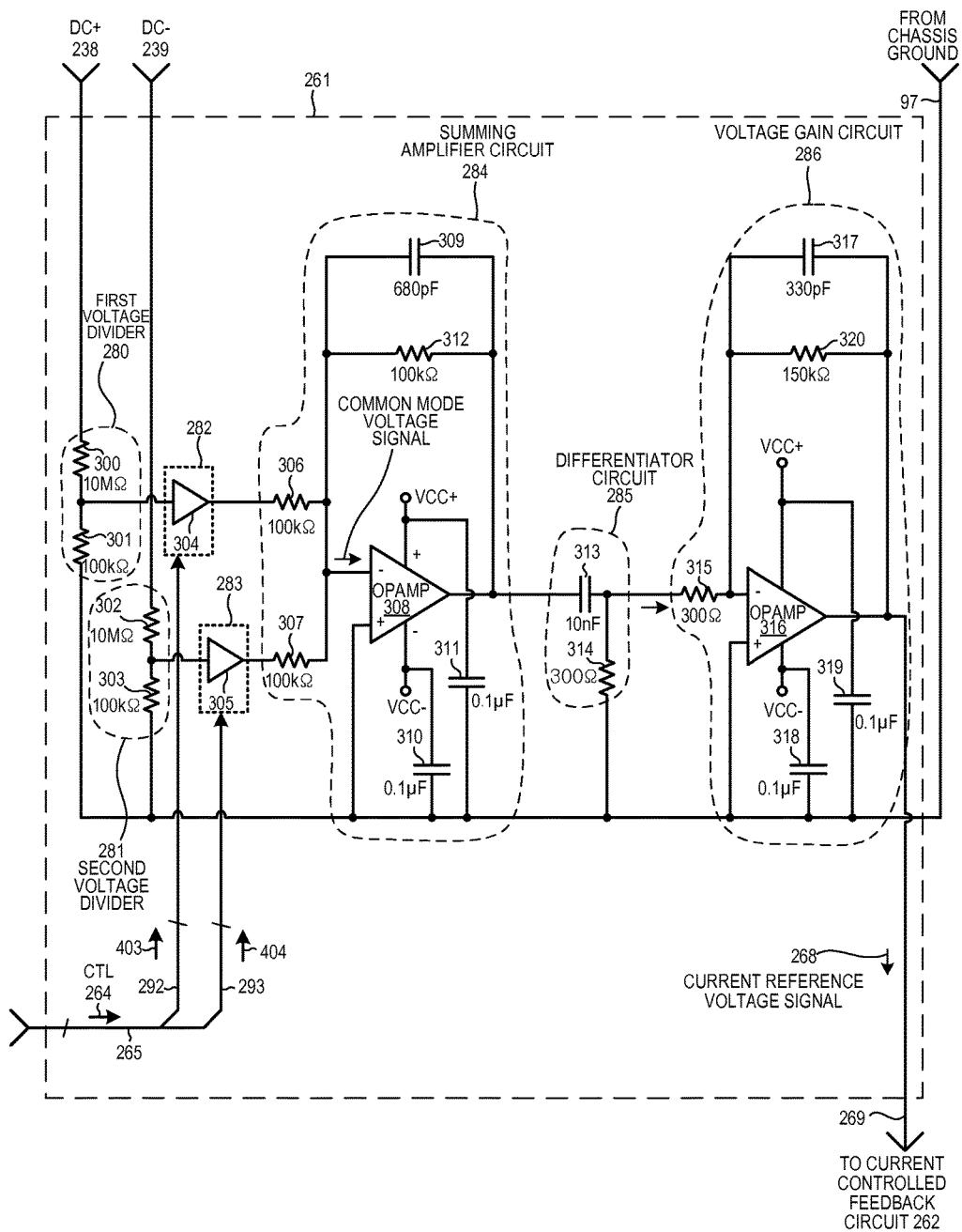
FIG. 22 is a detailed circuit diagram of current reference generator circuit 261.

FIG. 22 is a detailed circuit diagram of current reference generator circuit 261. First voltage divider 280 comprises resistors 300 and 301. Second voltage divider 281 comprises resistors 302 and 303. First configurable gain circuit 282 comprises a voltage gain amplifier 304. Second configurable gain circuit 283 comprises a voltage gain amplifier 305. Summing amplifier circuit 284 comprises input resistors 306 and 307, operational amplifier 308, capacitors 309, 310, and 311, and resistor 312.

Differentiator circuit 285 includes an RC filter comprising capacitor 313 and resistor 314. Voltage gain circuit 286 comprises input resistor 315, differential amplifier 316, capacitors 317, 318, and 319, and resistor 320.

Figures 23, 24:
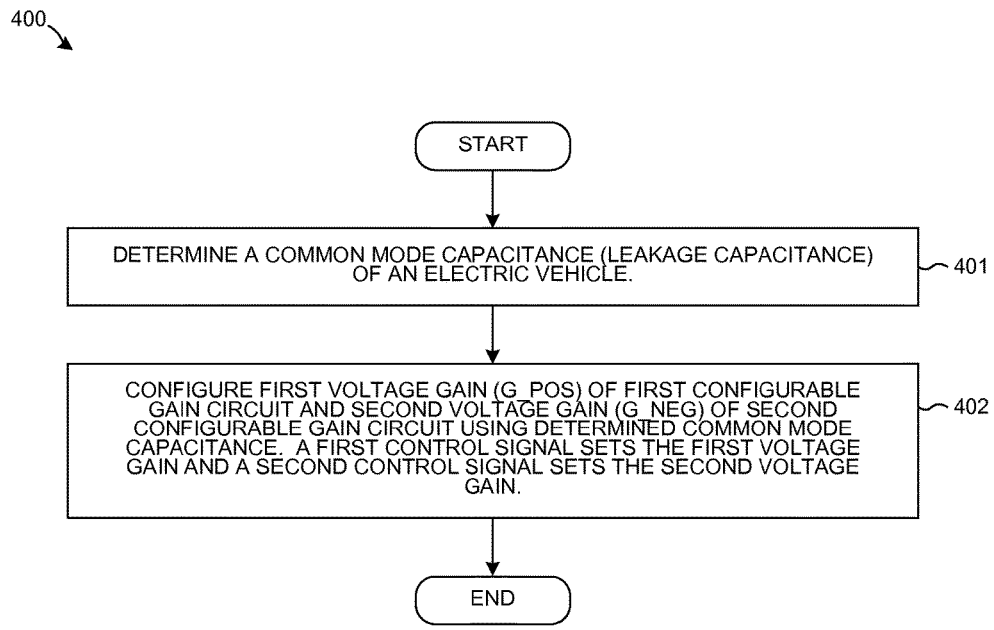
FIG. 23 shows an equation 321 for capacitance C_POS and an equation 322 for capacitance C_NEG.
FIG. 24 is flowchart of a method 400 in accordance with one novel aspect.

FIG. 23 shows an equation 321 for capacitance C_POS and an equation 322 for capacitance C_NEG. As shown in equations 321 and 322, the gain G_POS and gain G_NEG are configured by microcontroller 260 as shown in FIG. 21. If the parasitic capacitances C_POS and C_NEG are known for an electric vehicle, then microcontroller 260 can configure gain G_POS and gain G_NEG accordingly so that the desired leakage current can be generated according to equation 250 shown in FIG. 19.

FIG. 24 is flowchart of a method 400 in accordance with one novel aspect. In a first step (step 401), a common mode capacitance (or leakage capacitance) of an electric vehicle is determined. For example, in FIG. 18, common mode capacitance 236 of electric vehicle 84 is determined by obtaining capacitances for each electronic component of electric vehicle 85 from specifications provided by the manufacturer of the electronic component. Typically, such specifications refer to the capacitances as a "Y-capacitor", an "EMI capacitor", an "internal common mode capacitor", or "a common mode capacitor". The common mode capacitance is then determined from all of the obtained parasitic capacitances.

In a second step (step 402), a first voltage gain of a first configurable gain circuit and a second voltage gain of a second configurable gain circuit are configured according to the common mode capacitances determined in step 401. A first digital control signal sets the first voltage gain and a second digital control signal sets the second voltage gain. For example, in FIG. 22, first digital signal 403 sets voltage gain G_POS of configurable gain circuit 304 and second digital signal 404 sets voltage gain G_NEG of configurable gain circuit 305.

Figure 25:
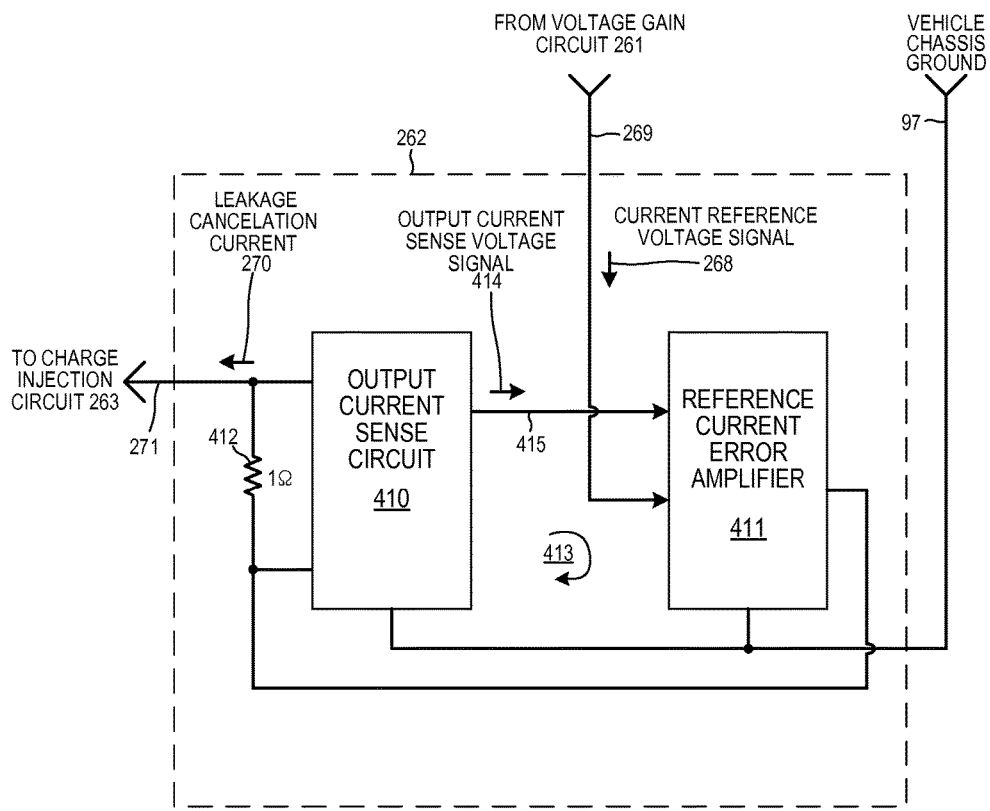
FIG. 25 is a block diagram of current controlled feedback circuit 262.

FIG. 25 is a block diagram of current controlled feedback circuit 262. Current controlled feedback circuit 262 comprises output current sense circuit 410, reference current error amplifier 411, and a resistor 412. Output current sense circuit 410 and reference current error amplifier 411 form a control loop 413 that ensures leakage cancelation current 270 to be injected is controlled as desired. Reference current error amplifier 411 receives current reference voltage signal 268 from current reference gain circuit 261 via conductor 269 and also receives output current sense voltage signal 414 from output current sense circuit 410 via conductor 415. Output current sense circuit 410 generates output current sense voltage signal 414 by sensing current through resistor 412.

Figure 26:
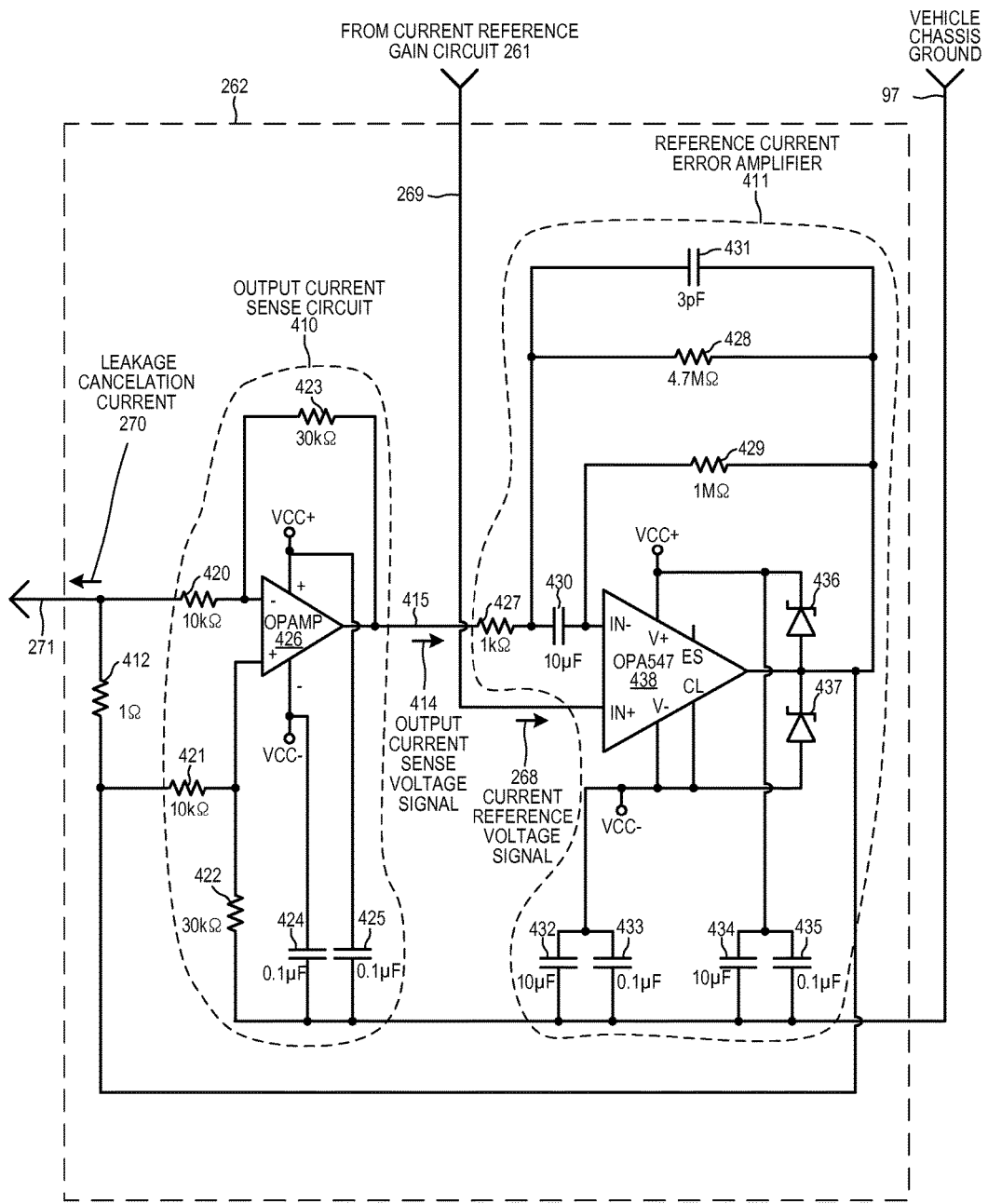
FIG. 26 is a detailed circuit diagram of current controlled feedback circuit 262.

FIG. 26 is a detailed circuit diagram of current controlled feedback circuit 262. Output current sense circuit 410 includes resistors 420, 421, 422, and 423, capacitors 424 and 425, and operational amplifier 426. Reference current error amplifier 411 includes resistors 427, 428, and 429, capacitors 430, 431, 432, 433, 434, and 435, zener diodes 436 and 437, and amplifier 438.

Figure 27:
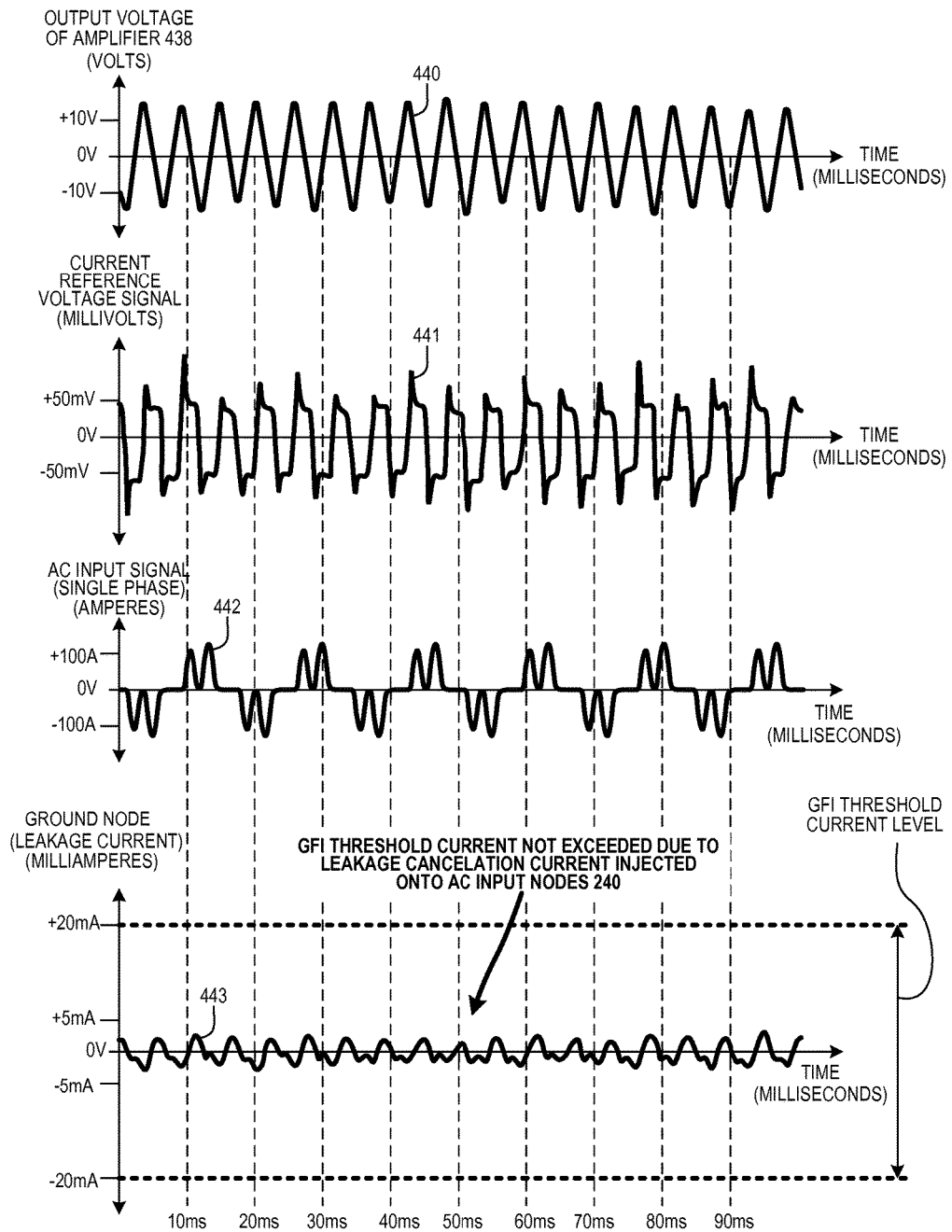
FIG. 27 is a diagram of waveforms at various nodes of charger module 231 during charging mode operation.

FIG. 27 is a diagram of waveforms at various nodes of charger module 231 during charging mode operation. Waveform 440 is the output voltage of operational amplifier 438. Waveform 441 is current reference voltage signal 268 generated by current reference generator circuit 261 and supplied onto conductor 269. Waveform 442 is a single phase of the AC supply voltage supplied by charging station 83 on one of the AC input nodes 240. Waveform 443 is leakage current 237 (or common mode current) present on ground node 85. As shown in FIG. 27, leakage current 237 does not exceed pre-determined current level of GFI circuit 120 and charging operation will not be affected by leakage current 237 under normal operating conditions.

Figure 28:
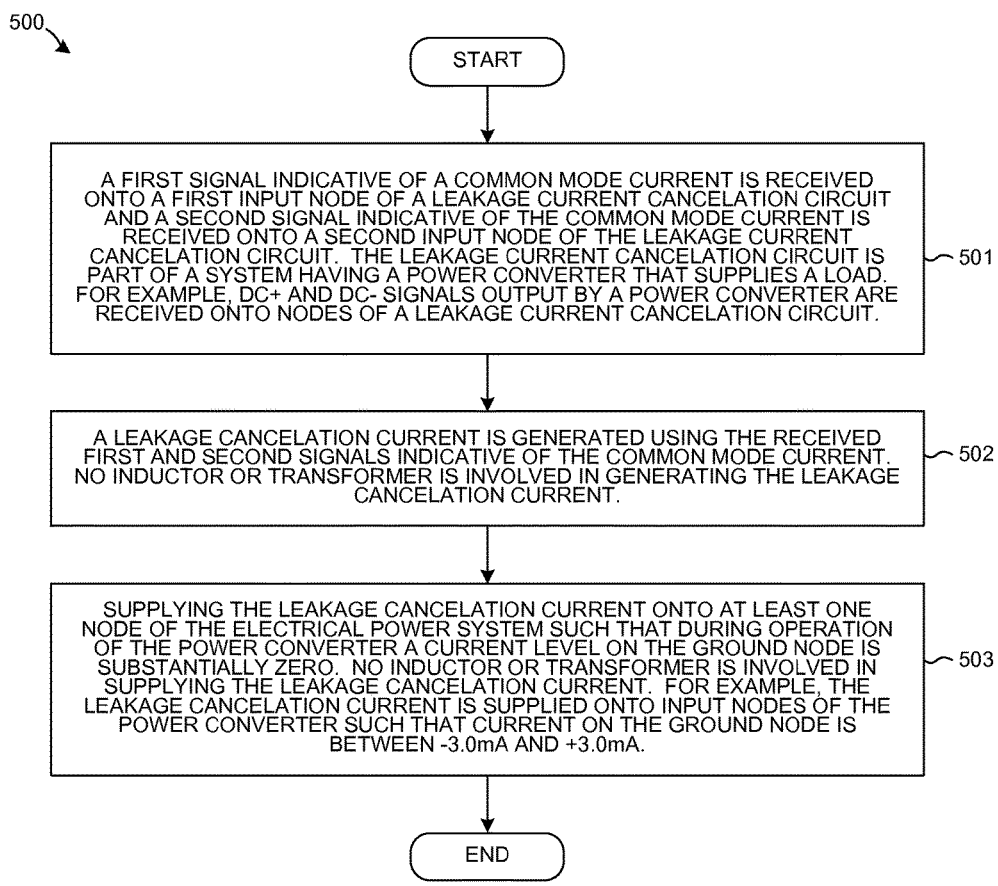
FIG. 28 is a flowchart of a method 500 in accordance with another novel aspect.

FIG. 28 is a flowchart of a method 500 in accordance with another novel aspect. In a first step (step 501), a first voltage signal is received onto a first input node of a leakage current cancelation circuit and a second voltage signal is received onto a second input node of the leakage current cancelation circuit. The first and second voltage signals are signals indicative of common mode current of an electric vehicle. For example, in FIG. 20, current reference generator circuit 261 of leakage current cancelation circuit 233 receives DC+ voltage signal 238 and DC− voltage signal 239. DC+ voltage signal 238 and DC− voltage signal 239 are signals indicative of common mode current 237 of electric vehicle 84.

In a second step (step 502), a leakage cancelation current is generated using the received first and second signals indicative of the common mode current. No inductor, transformer, or magnetic device is involved in generating the leakage cancelation current. In the example of FIG. 20, microcontroller 260, current reference generator circuit 261, and current controlled feedback circuit 262 operate to generate a leakage cancelation current 270. Current reference generator circuit 261 receives DC+ voltage signal 238 and DC− voltage signal 239 and generates a current reference voltage signal 268 by performing analog amplifying, summing, and differentiation functions in accordance with equation 250 of FIG. 19. Current controlled feedback circuit 262 receives current reference voltage signal 268 and generates and outputs leakage cancelation current 270. No inductor, transformer, or magnetic device is involved in generating leakage cancelation current 270.

In a third step (step 503), a leakage cancelation current is supplied onto at least one node of the electrical power system such that during operation of the power converter a current level on the ground node is substantially zero. No inductor or transformer is involved in supplying the leakage cancelation current. For example, in FIG. 20, current controlled feedback circuit 262 generates leakage cancelation current 270 and is injected onto AC input nodes 240 via charge injection circuit 263. As shown in waveform 443, the current level at ground node 85 does not exceed +/−3.0 mA. In addition, the pre-determined current level of GFI circuit 120 is not exceeded and charging operation will not be interrupted under normal conditions.

FIGS. 29, 30, and 31 illustrate various views of charger module 231. FIG. 29 is a front view of charger module 231. FIG. 30 is a side view of charger module 231. FIG. 31 is a perspective view of charger module 231. Charger module 231 includes a metal enclosure 510, output terminals 511 and 512, and input terminals 513, 514, and 515. Output terminals 511 and 512 provide the DC supply to circuitry within electric vehicle 84. Input terminals 513, 514, and 515 receive the AC supply from charging station 83. Centers of adjacent input terminals 513, 514, and 515 are spaced a distance D1 from each other. Centers of adjacent output terminals 511 and 512 are spaced a distance D2 from each other. Distance D1 is substantially equivalent to distance D2. As a result of not including any magnetic components, such as transformers, inductors, and Hall Effect devices, charger module 231 is more compact than conventional charger modules. Due to the compact structure, charger module 231 outputs at least one-hundred and seventy watts of output per cubic inch of volume of the charger module. The height of charger module 231 is less than six times distance D1. The length of charger module 231 is less than seven times distance D1. The width of charger module 231 is less than distance D1.

Figure 32:
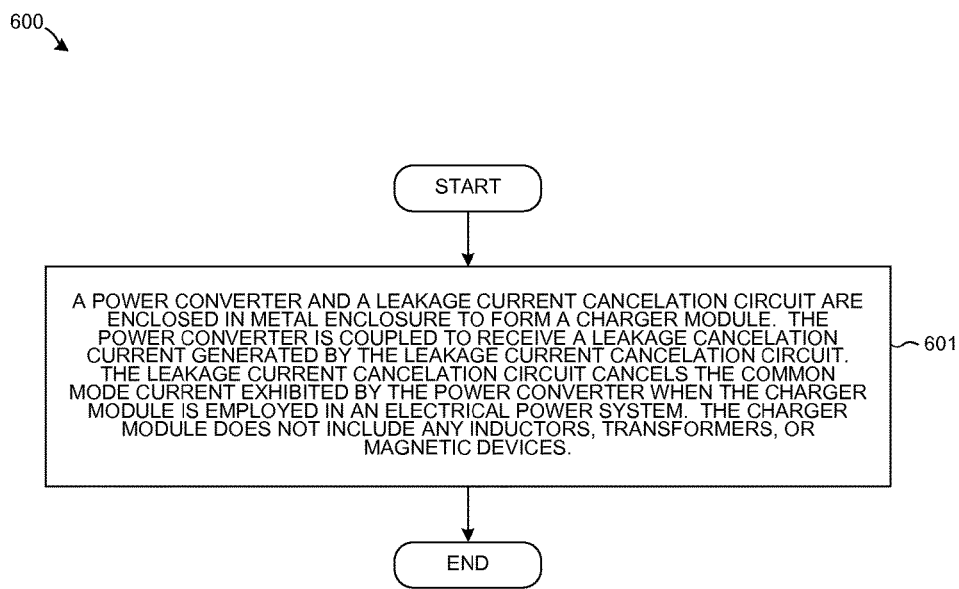
FIG. 32 is a flowchart of a method of manufacture 600.

FIG. 32 is a flowchart of a method of manufacture 600. In a first step (step 601), a power converter and a leakage current cancelation circuit are enclosed in metal enclosure to form a charger module. The power converter is coupled to receive a leakage cancelation current generated by the leakage current cancelation circuit. The leakage current cancelation circuit cancels the common mode current exhibited by the power converter when the charger module is employed in an electrical system. For example, in FIG. 31, a metal enclosure 510 surrounds power converter 232 and leakage current cancelation circuit 233 forming a charger module 231.

Figure 33:
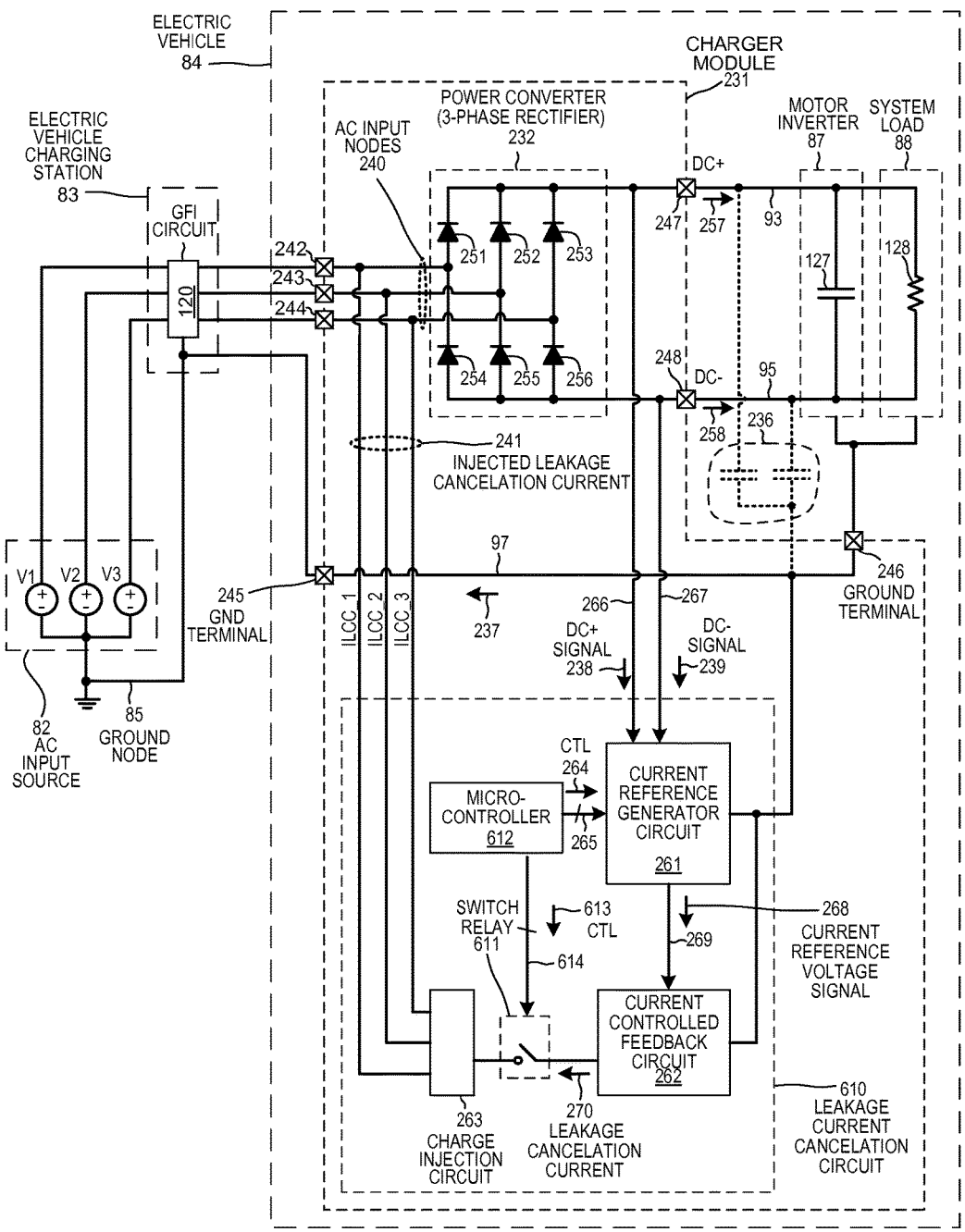
FIG. 33 is a diagram of another embodiment of a leakage current cancelation circuit 610.

FIG. 33 is a diagram of another embodiment of a leakage current cancelation circuit 610. Leakage current cancelation circuit 610 is substantially similar to leakage cancelation circuit 233 of FIG. 20, except that leakage current cancelation circuit 610 includes a switch relay 611. Microcontroller 612 supplies digital control signal 613 onto switch relay 611 via conductor 614. Digital control signal 613 controls switch relay 611 to switch on and to switch off. Initially when charging operation is activated, transients from the AC supply lines may be undesirably injected onto the charger module. To prevent such undesirable effects, microcontroller 612 controls switch relay 611 to switch off for a startup delay time period when charging operation is initiated. After the startup delay time period, microcontroller 612 controls switch relay 611 to switch on. The startup delay time period is typically between two-hundred milliseconds and five-hundred milliseconds. Leakage current cancelation circuit 610 is not activated until after the startup delay time period and no leakage cancelation current 270 is generated.

Figure 34:
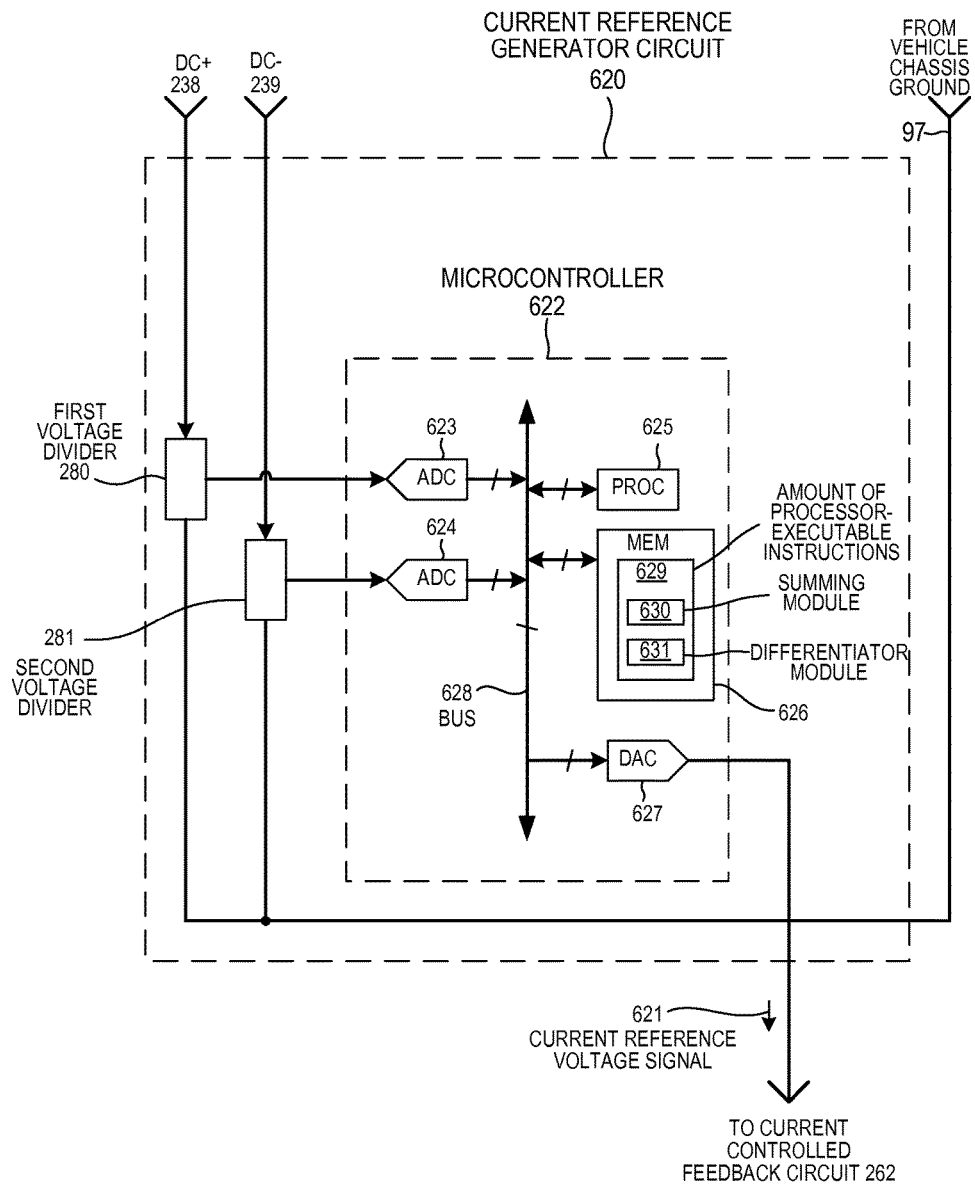
FIG. 34 is a diagram of another embodiment of a current reference generator circuit 620.

FIG. 34 is a diagram of another embodiment of a current reference generator circuit 620. Current reference generator circuit 620 operates similarly to current reference generator circuit 261 of FIG. 22, except that the current reference generator circuit 620 generates current reference voltage signal 621 with digital logic rather than analog circuitry. Current reference generator circuit 620 includes the first voltage divider 280, the second voltage divider 281, and a microcontroller 622. Microcontroller 622 comprises a first Analog-to-Digital Converter (ADC) 623, second ADC 624, a processor 625, memory 626, a Digital-to-Analog Converter (DAC) 627, and a communication bus 628. Memory 626 stores an amount of processor executable instructions 629. Processor executable instructions 629 comprise a summing module 630 and a differentiator module 631. By executing Processor executable instructions 629, microcontroller 622 performs in the digital domain the same functions performed by analog circuitry 284, 285, and 286 of FIG. 22. Processor executable instructions 629 for summing and differentiating, such as in analog circuitry 284, 285, and 286 of FIG. 22, are known in the art.

Figure 35:
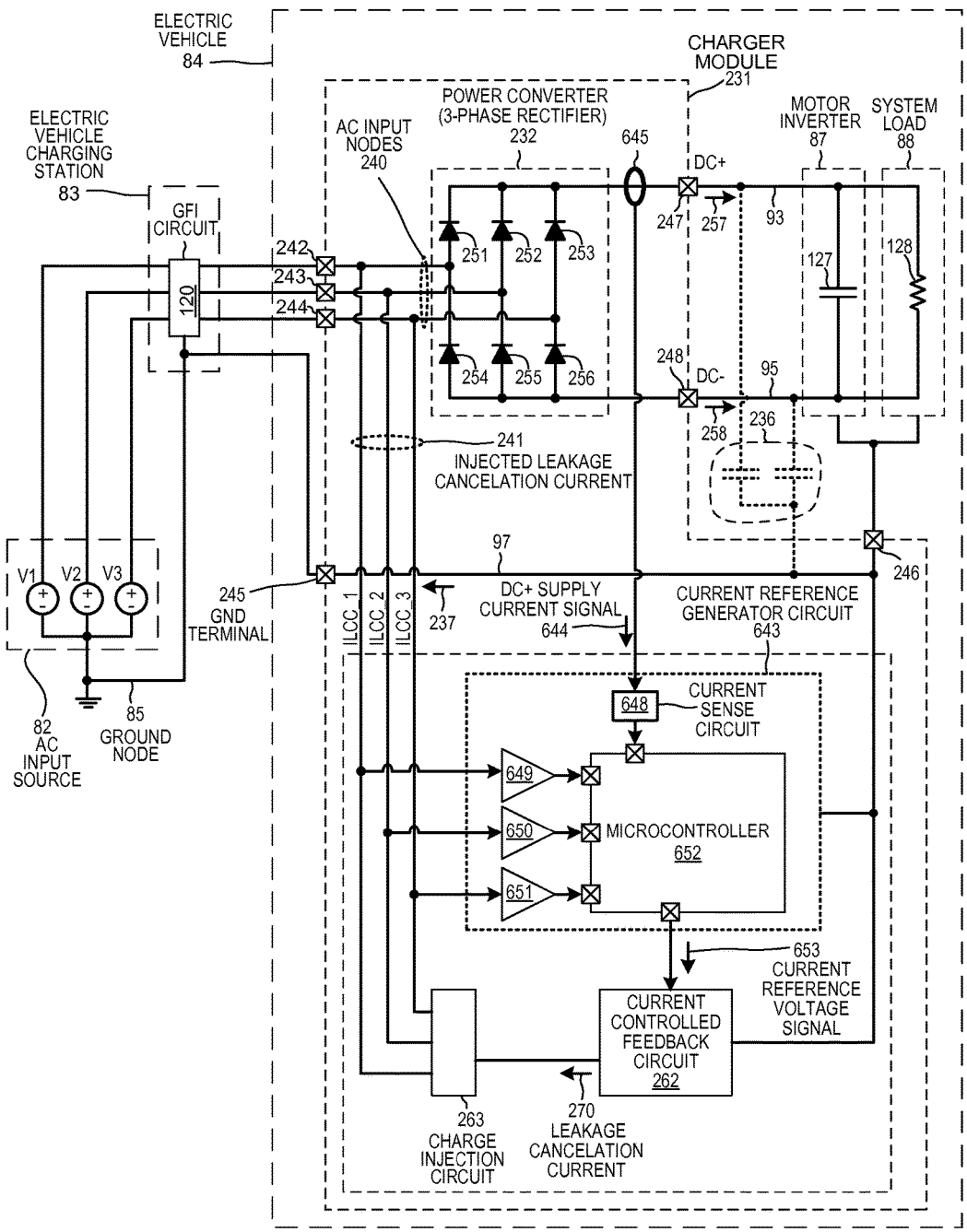
FIG. 35 is a diagram of another embodiment of a current reference generator circuit 643.

FIG. 35 is a diagram of another embodiment of a current reference generator circuit 643. Current reference generator circuit 643 and current controlled feedback circuit 262 form the leakage cancelation current generator. Current reference generator circuit 643 receives the DC+ supply current signal 644 from current sense circuit 645. In one example, current sense circuit 645 is realized as a transformer or a Hall-effect current sensor device. In this example, current reference generator circuit 643 receives only one signal indicative of the leakage current of electric vehicle 84 which is DC+ supply current signal 644. Current reference generator circuit 643 comprises a current sense circuit 648, amplifier circuits 649, 650, and 651, and a microcontroller 652. Current reference generator circuit 643 employs digital techniques to generate current reference voltage signal 653 that is supplied onto current controlled feedback circuit 262.

Figure 36:
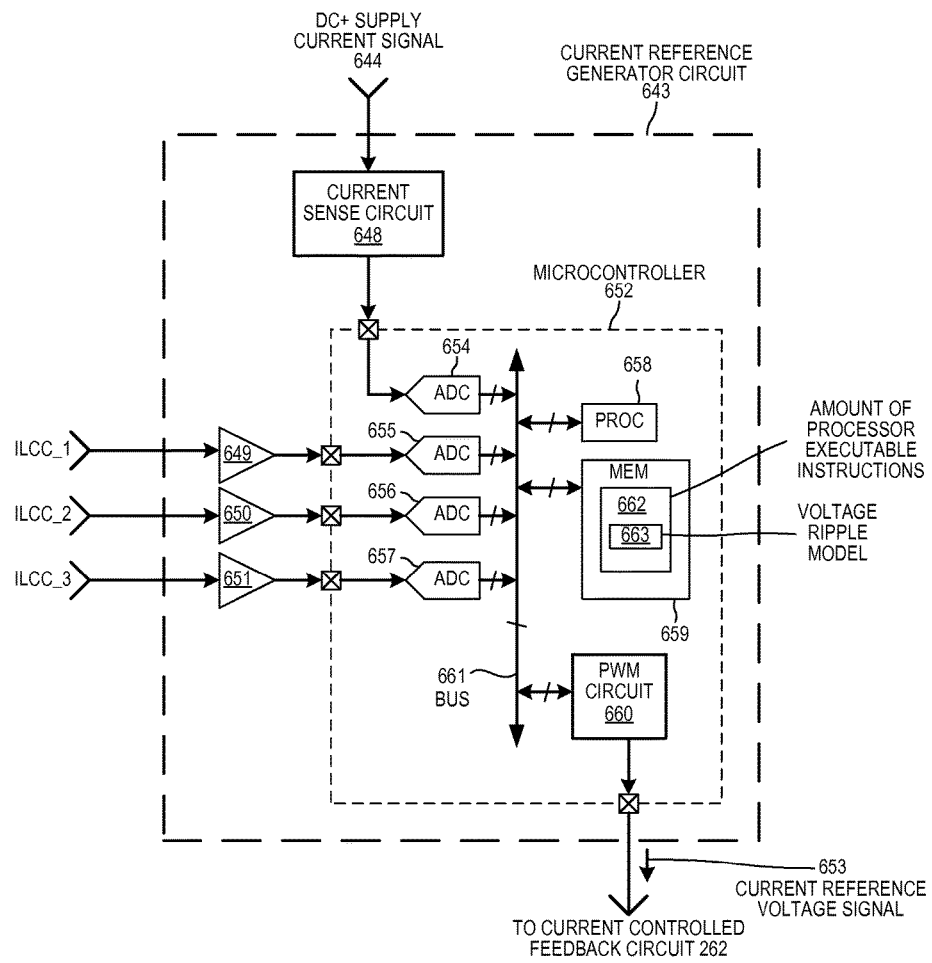
FIG. 36 is a more detailed block diagram of current reference generator circuit 643.

FIG. 36 is a more detailed block diagram of current reference generator circuit 643. Microcontroller 652 comprises ADCs 654, 655, 656, and 657, a processor 658, memory 659, a PWM circuit 660, and communication bus 661. Memory 659 stores an amount of processor executable instructions 662 that includes a voltage ripple model instruction 663. By sensing current on the DC+ conductor 93, the voltage ripple model is used to generate current reference voltage signal 653.

Figure 37:
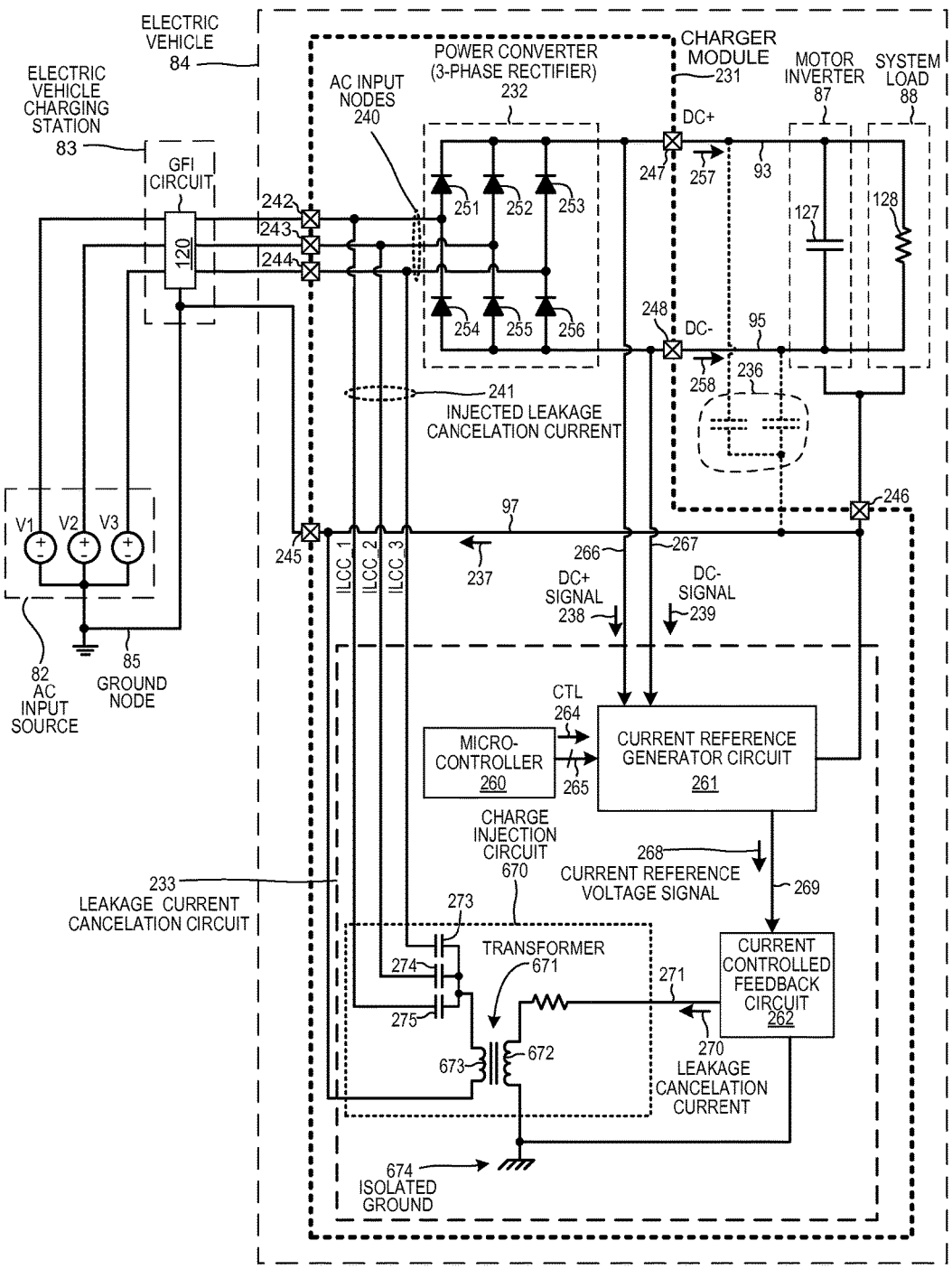
FIG. 37 is a diagram of another embodiment of charge injection circuit 670.

FIG. 37 is a diagram of another embodiment of charge injection circuit 670. Charge injection circuit 670 comprises a transformer 671 having a first winding 672 and a second winding 673. First winding 672 is coupled between conductor 271 and another ground node 674. Ground node 674 is isolated from ground node 85. Second winding 673 is coupled between capacitors 273, 274, and 275 and vehicle chassis ground 97.

Figure 38:
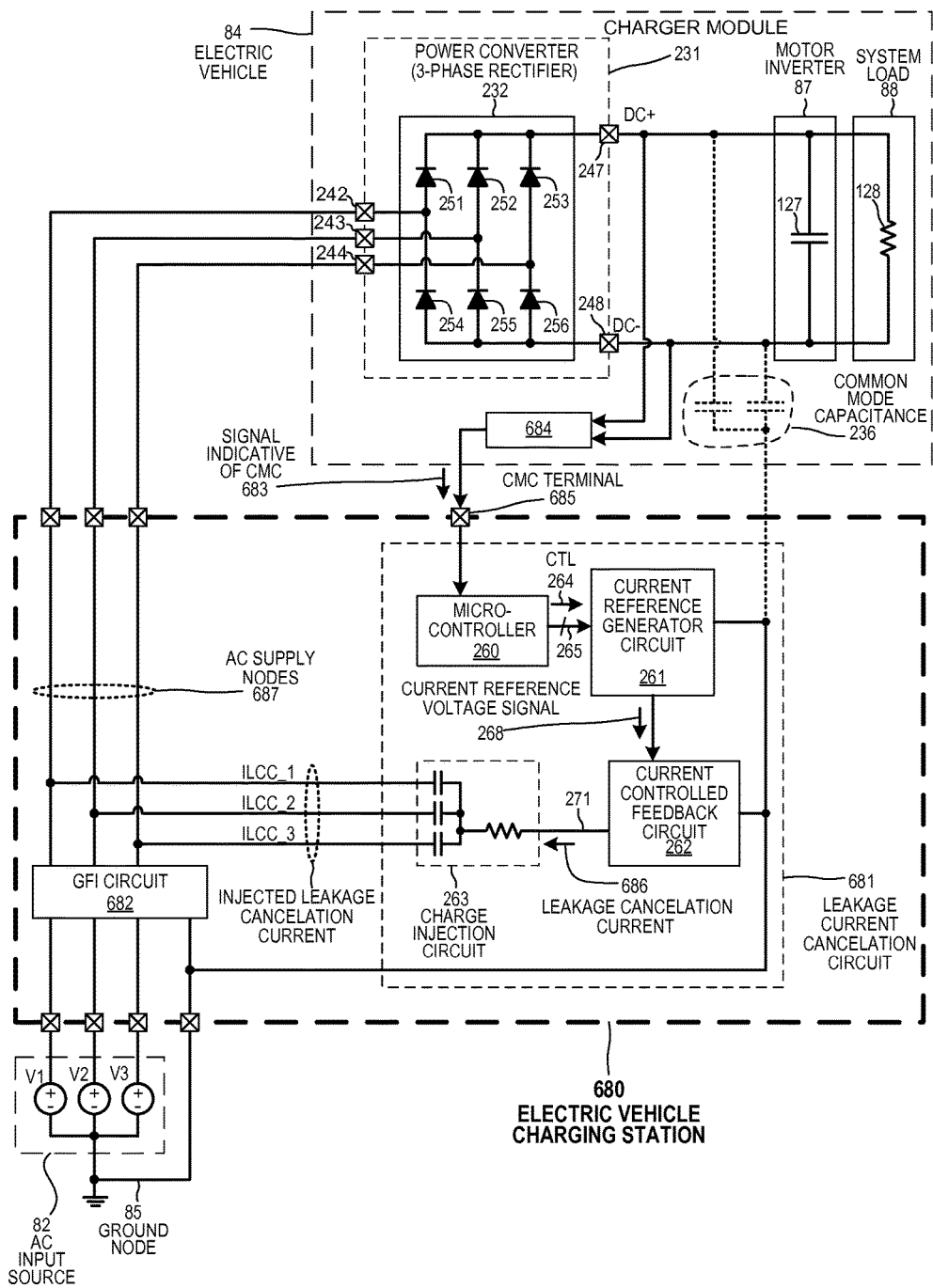
FIG. 38 is a diagram of an electric vehicle charging station 680 having a novel leakage current cancelation circuit 681 and a conventional GFI circuit 682.

FIG. 38 is a diagram of an electric vehicle charging station 680 having a novel leakage current cancelation circuit 681 and a conventional GFI circuit 682. Leakage current cancelation circuit 681 receives a signal indicative of common mode current 683 from digital logic circuitry 684 within the electric vehicle via common mode current terminal 685. Microcontroller 260, current reference generator circuit 261, and current controlled feedback circuit 262 form the leakage cancelation current generator disposed within the charging station 680. Leakage current cancelation circuit 681 generates a leakage cancelation current 686 in a substantially similar fashion as leakage current cancelation circuit 233 of FIG. 20. Leakage current cancelation circuit 681 supplies the leakage cancelation current 686 onto AC supply nodes 687 via charge injection circuit 263.

Figure 39:
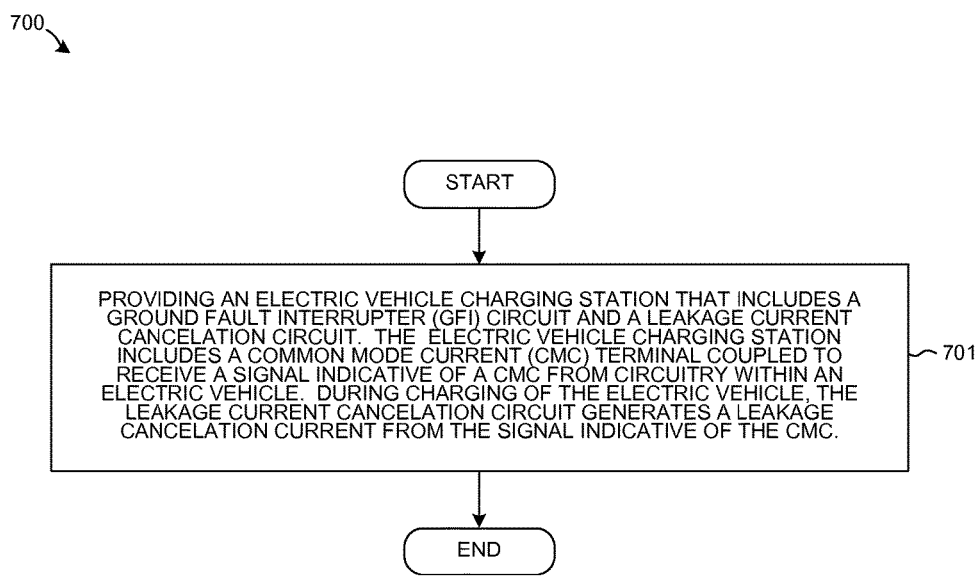
FIG. 39 is a flowchart of a method 700 in accordance with another novel aspect.

FIG. 39 is a flowchart of a method 700 in accordance with another novel aspect. In a first step (step 701), an electric vehicle charging station is provided that includes a GFI circuit and a leakage current cancelation circuit. The electric vehicle charging station includes a common mode current terminal coupled to receive a signal indicative of a common mode current (or leakage current) from circuitry within an electric vehicle. During charging of the electric vehicle, the leakage current cancelation circuit generates a leakage cancelation current from the signal indicative of the common mode current. In the example of FIG. 38, electric vehicle charging station 680 is provided and includes GFI circuit 682 and leakage current cancelation circuit 681. Common mode current terminal 685 receives signal 683 indicative of common mode current and generates leakage cancelation current 686 that is injected onto AC supply nodes 687.

Although certain specific embodiments are described above for instructional purposes, the teachings of this patent document have general applicability and are not limited to the specific embodiments described above. For example, although leakage current cancelation circuit 233 of FIG. 18 involved three phase charging, the leakage current cancelation circuit 233 may also be employed in a split-phase charging system. Accordingly, various modifications, adaptations, and combinations of various features of the described embodiments can be practiced without departing from the scope of the invention as set forth in the claims.

What is claimed is:

1. A leakage current cancelation circuit that is part of an electrical power system having a power converter, a load, and a ground node, the leakage current cancelation circuit comprising:
   a first input node that receives a first signal from a first node, wherein a common mode current is present on the ground node during operation of the electrical power system, and wherein the first node is selected from the group consisting of: an input node of the power converter, an output node of the power converter, and a node coupled to the ground node;
   a leakage cancelation current generator that receives the first signal from the first input node, wherein the leakage cancelation current generator generates a leakage cancelation current without directly sensing the common mode current; and
   a first output node, wherein the leakage cancelation current that is generated by the leakage cancelation current generator is supplied onto the first output node, and wherein the output node is coupled to a second node selected from the group consisting of: an input node of the power converter, an output node of the power converter, and a node coupled to the ground node.

2. The leakage current cancelation circuit of claim 1, wherein the power converter is supplied by an electrical power source, wherein the power converter, leakage current cancelation circuit, and the electrical power source share common ground, and wherein the electrical power system has one and only one ground node.

3. The leakage current cancelation circuit of claim 1, wherein the power converter and the leakage current cancelation circuit are parts of a charger module that supplies the load.

4. The leakage current cancelation circuit of claim 1, wherein no inductor, transformer, or magnetic device is involved in generating the leakage cancelation current.

5. The leakage current cancelation circuit of claim 1, wherein the leakage cancelation current has a magnitude substantially equal to a magnitude of the common mode current under normal charging conditions, and wherein the leakage cancelation current has a sign opposite a sign of the common mode current under normal charging conditions.

6. The leakage current cancelation circuit of claim 1, wherein the power converter is selected from the group consisting of an AC-to-AC power converter, an AC-to-DC power converter, a DC-to-DC power converter, and a DC-to-AC power converter.

7. The leakage current cancelation circuit of claim 1, wherein the first input node is coupled to a first output node of the power converter, and wherein the leakage current cancelation circuit further comprises:
   a second input node that is coupled to a second output node of the power converter, wherein the second input node is coupled to receive a second signal, and wherein the leakage cancelation current generator also receives the second signal from the second input node, and wherein the leakage cancelation current generator generates the leakage cancelation current using the first signal and the second signal.

8. The leakage current cancelation circuit of claim 7, wherein the first signal is a signal indicative of an AC voltage between the first input node and the ground node, and wherein the second signal is a signal indicative of an AC voltage between the second input node and the ground node.

9. The leakage current cancelation circuit of claim 1, wherein the first output node is coupled to a first input node of the power converter, and wherein the leakage current cancelation circuit further comprises:
   a second output node that is coupled to a second input node of the power converter; and
   a third output node that is coupled to a third input node of the power converter, wherein the leakage cancelation current generator supplies the leakage cancelation current onto the first output node, the second output node, and the third output node via a charge injection circuit.

10. A leakage current cancelation circuit that is part of an electrical power system having a power converter, a load, and a ground node, the leakage current cancelation circuit comprising:
    a first input node that receives a first signal indicative of a common mode current from a first node, wherein the common mode current is present on the ground node during operation of the electrical power system, and wherein the first node is selected from the group consisting of: an input node of the power converter, an output node of the power converter, and a node coupled to the ground node;
    a leakage cancelation current generator that receives the first signal indicative of the common mode current from the first input node, and wherein the leakage cancelation current generator generates a leakage cancelation current;
    a first output node, wherein the leakage cancelation current that is generated by the leakage cancelation current generator is supplied onto the first output node, and wherein the output node is coupled to a second node selected from the group consisting of: an input node of the power converter, an output node of the power converter, and a node coupled to the ground node, and wherein the first input node is coupled to a first output node of the power converter; and
    a second input node that is coupled to a second output node of the power converter, wherein the second input node is coupled to receive a second signal indicative of the common mode current, and wherein the leakage cancelation current generator also receives the second signal indicative of the common mode current from the second input node, wherein the leakage cancelation current generator generates the leakage cancelation current using the first signal indicative of the common mode current and the second signal indicative of the common mode current, wherein the first signal indicative of the common mode current is a positive supply voltage output by the power converter, and wherein the second signal indicative of the common mode current is a negative supply voltage output by the power converter.

11. A leakage current cancelation circuit that is part of an electrical power system having a power converter, a load, and a ground node, the leakage current cancelation circuit comprising:
    a first input node that receives a first signal indicative of a common mode current from a first node, wherein the common mode current is present on the ground node during operation of the electrical power system, and wherein the first node is selected from the group consisting of: an input node of the power converter, an output node of the power converter, and a node coupled to the ground node;

a leakage cancelation current generator that receives the first signal indicative of the common mode current from the first input node, wherein the leakage cancelation current generator generates a leakage cancelation current, and wherein the leakage cancelation current generator comprises:

a current reference generator circuit, wherein the current reference generator circuit is coupled to receive the first signal indicative of the common mode current and a second signal indicative of the common mode current, and wherein the current reference generator circuit generates a current reference voltage signal; and a current controlled feedback circuit that is coupled to receive the current reference voltage signal and generate the leakage cancelation current; and a first output node, wherein the leakage cancelation current that is generated by the leakage cancelation current generator is supplied onto the first output node, and wherein the output node is coupled to a second node selected from the group consisting of: an input node of the power converter, an output node of the power converter, and a node coupled to the ground node.

12. A method comprising:
(a) receiving a first signal onto a first input node of a leakage current cancelation circuit and receiving a second signal onto a second input node of the leakage current cancelation circuit, wherein the leakage current cancelation circuit is part of an electrical power system having a power converter, a load, and a ground node; and
(b) generating a leakage cancelation current, wherein the leakage cancelation current is generated by performing summing and differentiation functions in accordance with an equation, and wherein the equation used to generate the leakage cancelation current involves the first signal, the second signal, and capacitances of the electrical power system.

13. The method of claim 12, wherein the generating of (b) does not involve any inductor, transformer, or magnetic device.

14. The method of claim 12, wherein a sum of the leakage cancelation current and the common mode current is substantially zero under normal charging conditions.

15. The method of claim 12, further comprising:
(c) supplying the leakage cancelation current onto at least one node of the electrical power system such that during operation of the power converter a current level on the ground node is between −3.0 milliamperes and +3.0 milliamperes.

16. A method comprising:
(a) receiving a first signal indicative of a common mode current onto a first input node of a leakage current cancelation circuit and receiving a second signal indicative of the common mode current onto a second input node of the leakage current cancelation circuit, wherein the leakage current cancelation circuit is part of an electrical power system having a power converter, a load, and a ground node;
(b) generating a leakage cancelation current from the first signal indicative of the common mode current and the second signal indicative of the common mode current; and
(c) supplying the leakage cancelation current onto at least one node of the electrical power system such that during operation of the power converter a current level on the ground node is between −3.0 milliamperes and +3.0 milliamperes, wherein the power converter is an AC-to-DC power converter, wherein the first signal indicative of the common mode current received in (a) is received from a first output node of the AC-to-DC power converter, wherein the second signal indicative of the common mode current received in (a) is received from a second output node of the AC-to-DC power converter, and wherein the supplying of (c) involves a charge injection circuit coupled to supply the leakage cancelation current generated in (b) onto a plurality of input nodes of the AC-to-DC power converter.

17. A circuit module comprising:
a power converter that is part of an electrical power system that includes a load and a ground node; and
means for receiving at least one signal from a node of the power converter, and for generating a leakage cancelation current from the at least one signal, wherein the leakage cancelation current is generated without using an inductor or a transformer to sense a current.

18. The circuit module of claim 17, wherein the means comprises an input node, a leakage cancelation current generator, and an output node, wherein the input node receives the at least one signal, wherein the leakage cancelation current generator receives the first signal and generates the leakage cancelation current using the first signal, and wherein the leakage cancelation current is supplied onto the output node.

19. The circuit module of claim 17, wherein no inductor, transformer, or magnetic device is involved in generating the leakage cancelation current.

20. The circuit module of claim 17, wherein under normal charging conditions, the leakage cancelation current has a sign opposite a sign of a common mode current that flows from the load, through a capacitance, and onto the ground node, and wherein under normal charging conditions, the leakage cancelation current cancels the common mode current.

21. The circuit module of claim 17, wherein the means is also for supplying the leakage cancelation current onto at least one node of the electrical power system such that during operation of the power converter a current level on the ground node is between −3.0 milliamperes and +3.0 milliamperes.

22. The circuit module of claim 17, wherein the at least one signal is a signal indicative of an AC voltage between a node of the power converter and the ground node.

* * * * *